(12) United States Patent
Hoshiya et al.

(10) Patent No.: US 6,937,449 B2
(45) Date of Patent: Aug. 30, 2005

(54) SPIN-VALVE HEAD CONTAINING CLOSED-FLUX-STRUCTURE DOMAIN CONTROL FILMS

(75) Inventors: Hiroyuki Hoshiya, Odawara (JP); Masahiko Hatatani, Odawara (JP); Hisashi Kimura, Odawara (JP); Hiroshi Ide, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 10/077,854

(22) Filed: Feb. 20, 2002

(65) Prior Publication Data

US 2003/0206384 A1 Nov. 6, 2003

(30) Foreign Application Priority Data

Jun. 13, 2001 (JP) ........................................ 2001-177925

(51) Int. Cl.[7] ................................................ G11B 5/39
(52) U.S. Cl. ................................................ 360/324.12
(58) Field of Search .................. 360/324.12, 324.11, 360/324.1, 324.2; 29/603.01, 603.02

(56) References Cited

U.S. PATENT DOCUMENTS

| | | | |
|---|---|---|---|
| 5,408,377 A | * 4/1995 | Gurney et al. | ............... 360/325 |
| 5,701,223 A | * 12/1997 | Fontana et al. | ........ 360/324.11 |
| 5,751,521 A | * 5/1998 | Gill | ............................ 360/314 |
| 6,023,395 A | * 2/2000 | Dill et al. | ................. 360/324.2 |
| 6,118,624 A | * 9/2000 | Fukuzawa et al. | ..... 360/324.12 |
| 6,153,320 A | * 11/2000 | Parkin | ........................ 428/693 |
| 6,175,475 B1 | * 1/2001 | Lin et al. | ................ 360/324.11 |
| 6,317,297 B1 | * 11/2001 | Tong et al. | .................. 360/314 |
| 6,381,105 B1 | * 4/2002 | Huai et al. | ................... 360/314 |
| 6,456,468 B1 | * 9/2002 | Hayashi | .................... 360/324.1 |
| 6,473,279 B2 | 10/2002 | Smith et al. | |
| 6,608,738 B2 | * 8/2003 | Sakakima et al. | ..... 360/324.11 |
| 6,608,739 B1 | * 8/2003 | Tanaka et al. | .......... 360/324.12 |
| 6,633,466 B2 | * 10/2003 | Sakaguci et al. | ....... 360/327.31 |
| 2001/0012188 A1 | * 8/2001 | Hasegawa et al. | ..... 360/324.12 |
| 2002/0034055 A1 | * 3/2002 | Seyama et al. | ......... 360/324.11 |

FOREIGN PATENT DOCUMENTS

| | | |
|---|---|---|
| JP | 7-73416 | 3/1995 |
| JP | 7-169026 | 7/1995 |
| JP | 10-173252 | 6/1998 |
| JP | 10-284768 | 10/1998 |
| JP | 11-259824 | 9/1999 |

OTHER PUBLICATIONS

Yang et al. "Magnetostatic Coupling in Patterned Spin Valves". Sep. 1998. IEEE Transactions on Magnetics. vol. 34, No. 5, pp. 2469–2472.*

Cross et al. "Magnetostatic Effects in Giant Magnetoresistive Spin Valve Devices". Applied Physics, Letter 69, Dec. 16, 1996, pp. 3935–3937.*

* cited by examiner

Primary Examiner—George J. Letscher
Assistant Examiner—Christopher R. Magee
(74) Attorney, Agent, or Firm—Antonelli, Terry, Stout & Kraus, LLP

(57) ABSTRACT

To provide a spin-valve type magnetic head having high read output even if track width is narrow and high stability, a magnetic head according to the invention is provided with a spin-valve type magnetoresistive element in which a single magnetic domain turning ferromagnetic layer is formed on a soft magnetic free layer via a non-magnetic separating layer, the soft magnetic free layer and the single magnetic domain turning ferromagnetic layer are magnetostatically coupled at the end of track width, a closed magnetic circuit is formed and the soft magnetic layer has magnetization substantially induced in a direction substantially perpendicular to an external magnetic field.

18 Claims, 15 Drawing Sheets

SPIN-VALVE HEAD CONTAINING CLOSED-FLUX-STRUCTURE DOMAIN CONTROL FILMS

BACKGROUND OF THE INVENTION

1. Field of the Invention

The present invention relates to a magnetic disk unit and a magnetoresistive element, particularly relates to a high recording density magnetoresistive element and its manufacturing process.

2. Description of the Related Arts

1) In the U.S. patent application U.S. Pat. No. 5,408,377, a spin-valve type magnetoresistive element using a free layer antiferromagnetically coupled is described.

2) In Japanese published unexamined patent application No. Hei 7-73416, a magnetoresistive read transducer in which an exchange layer is adjacent to a soft active layer is described.

3) In Japanese published unexamined patent application No. Hei 7-169026, a spin-valve sensor using an antiferromagnetic coupled film is described.

4) In Japanese published unexamined patent application No. Hei 10-173252, a magnetoresistive sensor in which high electric resistance magnetic layers are laminated is described.

5) In Japanese published unexamined patent application No. Hei 10-284768, a magnetoresistive element provided with an auxiliary magnetization reversal layer adjacent to a free ferromagnetic layer is described.

6) In Japanese published unexamined patent application No. Hei 11-259824, a tunnel magnetoresistive head in which a hard magnetic film is laminated on a free layer is described.

7) In the U.S. patent application U.S. Pat. No. 6,023,395, a tunnel junction magnetoresistive element using a biasing ferromagnetic layer stacked on a sensing ferromagnetic layer magnetostatically coupled with the sensing layer is described.

SUMMARY OF THE INVENTION

According to prior arts, a magnetic disk unit the recording density of which is high enough, particularly a magnetoresistive head that acted with enough efficiency and output for an external magnetic field in its reading back component could not be realized, further, satisfactory characteristics symmetrical enough could not be acquired and it was difficult to realize a function as a storage unit.

Recently, it is known that the magnetoresistance of a multilayer film in which ferromagnetic metallic layers are deposited via a non-magnetic metallic layer, so-called giant magnetoresistance is large. In this case, for the magnetoresistance, electric resistance varies depending upon an angle of magnetizations in the ferromagnetic layers set apart by the non-magnetic conductive layer . In case the giant magnetoresistance effect is used for a magnetoresistive element, structure called a spin valve is proposed. That is, the structure called the spin valve has the structure of an antiferromagnetic film/a ferromagnetic layer/a non-magnetic conductive layer/a soft magnetic free layer, and output can be acquired by substantially pinning the magnetization of the ferromagnetic layer closely in contact with the antiferromagnetic film by an exchange coupling field produced on an interface between the antiferromagnetic film and the ferromagnetic layer and turning the magnetization of the other soft magnetic free layer by an external magnetic field. The effect of the above-mentioned pinning is called pinning bias and the antiferromagnetic film that products this effect is called a pinning bias film. Also, the ferromagnetic layer the above-mentioned magnetization of which is substantially pinned is called a pinned layer or a ferromagnetic pinned layer. Similarly, the soft magnetic film the magnetization of which is turned by an external magnetic field is called a free layer or a soft magnetic free layer. In the pinned layer, magnetization is substantially pinned for an external magnetic field and in place of the antiferromagnetic film, a hard magnetic film, that is, material the magnetization of which is unchanged unless a relatively large magnetic field is applied can be also substituted. Recently, specular effect or multilayer structure having ferromagnetic pinned layers called a synthetic ferrimagnet is also proposed, however, all are similar in that the magnetization of the ferromagnetic layer having an interface directly bonded to the non-magnetic intermediate layer is substantially pinned.

A magnetoresistive head has magnetic domain control structure for turning the above-mentioned soft magnetic free layer a single magnetic domain. The magnetoresistive head has a function for turning the soft magnetic free layer a single magnetic domain and giving output without hysteresis for an external magnetic field. Structure called hard bias which is typical magnetic domain control structure has the following configuration. A hard magnetic film having predetermined thickness is arranged at both ends of a magnetoresistive film formed in the width of a sensitive region, that is, in track width. The magnetization of the hard magnetic film is set so that the hard magnetic film has residual magnetization in a direction of track width in a polarizing process, magnetostatic energy is reduced because magnetic charge generated at the end in the direction of track width and magnetic charge generated at the end of the soft magnetic free layer are offset by the residual magnetization and the soft magnetic free layer is turned a single magnetic domain. For the problem of turning a single magnetic domain by the hard-bias structure, when the track width of the magnetoresistive element is narrowed, concretely when track width is 0.2 to 0.1 µm or less, the effect of turning the hard magnetic film a single magnetic domain becomes excessive and the magnetization process according to an external magnetic field of the soft magnetic free layer is obstructed. To prevent such deterioration of efficiency, it is important to possibly reduce a magnetization amount in the hard magnetic film, that is, a residual magnetization amount, however, such reduction of a magnetization amount reduces the effect of turning the soft magnetic free layer a single magnetic domain and a probability in which the variation of the element may occur becomes high. Heretofore, such competition of high efficiency and stability has been solved by adopting the minimum magnetization amount in which stability is acquired, however, as track width is narrowed, a phenomenon that efficiency when stability is acquired is not sufficient occurs.

To achieve the compatibility of stability and high efficiency, the minimum quantity of the magnetic charge of the hard magnetic film and others is required to be arranged in a precise position in each track width of a magnetoresistive effect lamination film. However, in conventional type magnetic domain control structure, this cannot be realized in a magnetic head having recent narrow track width.

Then, the object of the invention is to provide a magnetic disk unit or a magnetic head using a magnetic sensor respectively corresponding to high density recording and having long-term high reliability, in more concrete, to provide a spin-valve type magnetic head in which a single magnetic domain turning magnetic film for offsetting magnetic charge at the end of a soft magnetic free layer is deposited on a magnetoresistive film, which uses the stable and efficient spin-valve type magnetoresistance element having substantially the same track width and the read output of which is high and further, to provide a magnetic disk unit using the magnetic head.

In the invention, to provide the magnetic disk unit provided with the magnetic sensor using giant magnetoresistance e corresponding to high recording density in the magnetic head, a magnetoresistance having deposition structure of a spin-valve type giant magnetoresistance lamination film used for the magnetic sensor, that is, a soft magnetic free layer/a non-magnetic conductive layer/a ferromagnetic pinned layer/an antiferromagnetic film is used. The antiferromagnetic film applies exchange coupling bias for substantially pinning the magnetization of the ferromagnetic pinned layer and is formed directly in contact with the ferromagnetic pinned layer or may be also indirectly formed via magnetic junction. Or in place of the antiferromagnetic film, another bias applying means, for example, the residual magnetization of a hard magnetic film is used and current bias may be also used. In the invention, to solve the problems and acquire the magnetic disk unit where the magnetic sensor and the magnetic head respectively corresponding to high recording density are mounted, a single magnetic domain turning ferromagnetic layer is deposited on a soft magnetic free layer via a non-magnetic separating layer. The non-magnetic separating layer has a function that separates the single magnetic domain turning ferromagnetic layer and the soft magnetic free layer so that no magnetic coupling is produced between them. That is, a magnetic head provided with a spin-valve type magnetoresistive element in which a ferromagnetic pinned layer, a non-magnetic intermediate layer, a soft magnetic free layer, a non-magnetic separating layer and a single magnetic domain turning ferromagnetic layer are laminated in the order and which is formed in substantially the same track width corresponding to predetermined magnetic field sensing width and characterized in that the soft magnetic free layer and the single magnetic domain turning ferromagnetic layer substantially have no ferromagnetic or antiferromagnetic coupling on the interface via the non-magnetic separating layer, the magnetization of the single magnetic domain turning ferromagnetic layer and the magnetization of the soft magnetic free layer are magnetostatically coupled at the end of track width, a closed magnetic circuit is formed, the soft magnetic free layer is turned a single magnetic domain so that it has magnetization substantially pinned in a direction substantially perpendicular to an external magnetic field, a direction of the magnetization of the ferromagnetic pinned layer is substantially pinned for an external magnetic field, the magnetization of the soft magnetic free layer is turned according to an external magnetic field, when a relative angle between the magnetization of the soft magnetic free layer and the magnetization of the ferromagnetic pinned layer varies, magnetoresistive change occurs in the magnetoresistive element and the magnetoresistive change is detected by a pair of electrodes is provided. Or a magnetic head having configuration that the above-mentioned element laminated structure is formed in substantially the same track width corresponding to predetermined magnetic field sensing width, no magnetic domain control structure such as a hard magnetic film arranged in a direction of track width is provided, the magnetization of the single magnetic domain turning ferromagnetic layer and the magnetization of the soft magnetic free layer are magnetostatically coupled at the end of track width and a closed magnetic circuit is formed is provided.

Also, a magnetic head based upon a magnetic head provided with a spin-valve type magnetoresistive element in which a ferromagnetic layer the direction of the magnetization of which is substantially pinned for an external magnetic field and a soft magnetic layer the magnetization of which can be turned according to an external magnetic field are laminated via a non-magnetic intermediate layer and characterized in that the magnetization of the soft magnetic layer is turned according to an external magnetic field and a relative angle between a direction of the magnetization of the soft magnetic layer and a direction of the magnetization of the ferromagnetic layer varies and magnetoresistance is produced and characterized in that a single magnetic domain turning ferromagnetic layer is formed on the soft magnetic layer via a non-magnetic separating layer, the soft magnetic layer and the single magnetic domain turning ferromagnetic layer are magnetostatically coupled at the end of track width, a closed magnetic circuit is formed and the soft magnetic layer has magnetization substantially induced in a direction substantially perpendicular to an external magnetic field is provided.

Also, a magnetic head provided with a spin-valve type magnetoresistive element in which a ferromagnetic pinned layer and a soft magnetic free layer are laminated via a non-magnetic intermediate layer and characterized in that the magnetization of the soft magnetic free layer is turned according to an external magnetic field, a relative angle between the magnetization of the soft magnetic free layer and the magnetization of the ferromagnetic pinned layer varies and magnetoresistance is produced, a single magnetic domain turning ferromagnetic layer is formed on the soft magnetic free layer via a non-magnetic separating layer, the soft magnetic free layer and the single magnetic domain turning ferromagnetic layer are magnetostatically coupled via the non-magnetic separating layer at the end of track width, a closed magnetic circuit is formed and as a result, the single magnetic domain turning ferromagnetic layer turns the soft magnetic free layer a single magnetic domain so that the soft magnetic free layer has magnetization substantially induced in a direction substantially perpendicular to an external magnetic field is provided.

The single magnetic domain turning ferromagnetic layer, the non-magnetic separating layer and the soft magnetic free layer are formed in substantially the same track width, have the end in substantially the same position and the single magnetic domain turning ferromagnetic layer has effect that offsets magnetic charge at the end of the soft magnetic free layer in a direction of track width because it keeps to have residual magnetization in the direction of track width and turns the soft magnetic free layer a single magnetic domain. The single magnetic domain turning ferromagnetic layer has substantially the same magnetization amount as the soft magnetic free layer or the magnetization amount is set so that it is more than a magnetization amount in the soft magnetic free layer to compensate loss because the single magnetic domain turning ferromagnetic layer and the soft magnetic free layer are separated by the non-magnetic separating layer. Owing to the above-mentioned single magnetic domain turning configuration, even if another magnetic domain control structure, for example structure that a hard magnetic film is arranged at the side end in the direction of track width of a magnetoresistive film is not provided, the effect of turning a single magnetic domain can be acquired.

The single magnetic domain turning ferromagnetic layer includes a ferromagnetic substance to generate magnetic charge of predetermined magnitude in a direction of track width. For a method of generating magnetic charge, an antiferromagnetic film can be used. That is, the method of generating magnetic charge can be achieved by generating an exchange coupling magnetic field in a ferromagnetic film by the antiferromagnetic film in the configuration of the antiferromagnetic film/the ferromagnetic film and turning a direction of the exchange coupling magnetic field a direction of track width. Or the single magnetic domain turning ferromagnetic layer can be also formed using a hard magnetic film. The effect of turning a single magnetic domain is acquired by residual magnetization, magnetized the hard magnetic film in the direction of track width . In this case, the dispersion of the magnetization of the hard magnetic film is transferred on the soft magnetic free layer and coercivity may be increased. To prevent the increase of coercivity, the single magnetic domain turning ferromagnetic layer is formed by a layered film composed of the hard magnetic film/a coupling layer/a ferromagnetic layer, the ferromagnetic layer absorbs the dispersion of the magnetization of the hard magnetic film and the effect of turning a single magnetic domain can be acquired by the total of the magnetic charge of the hard magnetic film and the ferromagnetic layer. The coupling layer antiferromagnetically couples the single magnetic domain turning ferromagnetic layer and the ferromagnetic layer or ferromagnetically (more weakly) couples them and produces effect that the ferromagnetic layer absorbs a magnetic field generated by the dispersion of the magnetization of the hard magnetic film.

It is desirable that the single magnetic domain turning ferromagnetic layer is formed by a thin film having high electric resistance to prevent the deterioration of output by shunt current of the magnetoresistive film in case in-plane current flows For a high resistive ferromagnetic film, there is a ferrite thin film made of , for example, magnetite $Fe_3O_4$ and it is made of oxide such as Fe, Ni, Mn and Co. Or the high resistive ferromagnetic film can be also formed by a mixture of non-conductive material and ferromagnetic metal. Particularly, for the non-conductive material, alumina and silicon oxide are suitable and for magnetic metal, Ni-75 to 85 Fe, Co-1 to 12Fe and Co-2 to 15Fe 1 to 30Ni are suitable. Similarly, a semiconductor and ferromagnetic metal may be also mixed. For the semiconductor, Si, Ge and a compound of these can be used. For a method of forming the mixed thin film, it may be also simultaneously formed using a conventional type vacuum thin film forming method, however, particularly when non-conductive material and magnetic metal are alternately deposited by extremely thin set thickness of approximately 1 nm, actually the disperse structure of magnetic metal by the formation of island structure can be formed and desirable characteristics are acquired.

The magnetization of the ferromagnetic pinned layer is required to be substantially parallel to a direction of an external magnetic field and the magnetization of the single magnetic domain turning ferromagnetic layer is required to be substantially perpendicular to a direction of an external magnetic field. This is called magnetizing and a magnetizing process for magnetizing in a predetermined direction is included in a process of the manufacturing method.

A method of manufacturing the above-mentioned magnetic head includes a process for polarizing a direction of the magnetization of the ferromagnetic pinned layer and a process for polarizing a direction of the magnetization of the single magnetic domain turning ferromagnetic layer. It is effective that the process for polarizing the direction of the magnetization of the ferromagnetic pinned layer and the process for polarizing the direction of the magnetization of the single magnetic domain turning ferromagnetic layer are made at different magnitizing temperature.

The magnetizing process includes a process for magnetizing at normal temperature and a process for polarizing by heating at predetermined temperature in a heat treatment furnace and on a hot plate. To polarize in different directions, the process for polarizing at room temperature and the magnetizing process by heat treatment are combined or the magnetizing processes by heat treatment at different temperature are combined. That is, it is desirable that pinning bias applying means used for the ferromagnetic pinned layer and magnetization pinning means used for the single magnetic domain turning ferromagnetic layer are made by different materials and different methods comparing to be made by the same material and the same method. Concretely, magnetizing heat treatment is applied to the ferromagnetic pinned layer using the antiferromagnetic film and the single magnetic domain turning ferromagnetic layer is formed by the hard magnetic film and polarizing at room temperature is applied to it. Or desirable characteristics can be acquired by applying magnetizing heat treatment at high temperature of approximately 250 to 300° C. using an antiferromagnetic film made of MnPt in which an exchange coupling magnetic field can be held up to high temperature to the ferromagnetic pinned layer, forming the single magnetic domain turning ferromagnetic layer by a magnetic film pinned by an antiferromagnetic layer made of MnIr and performing magnetizing heat treatment in different directions at 200° C.

The non-magnetic separating layer which is a component of the invention has a function that disconnects magnetic coupling between the soft magnetic free layer and the single magnetic domain turning ferromagnetic layer respectively touched via the non-magnetic separating layer. To realize this function, the non-magnetic separating layer is formed by material having no spontaneous magnetization at room temperature and at the operating temperature of the magnetic head so that no ferromagnetic coupling is produced between the soft magnetic free layer and the single magnetic domain turning ferromagnetic layer. In this case, the thickness of the non-magnetic separating layer is required to be at least 0.2 nm or more, generally 1 nm or more. However, when the non-magnetic separating layer is extremely thick, closed magnetic circuit structure cannot be realized enough. That reason is that when a gap thicker than the soft magnetic free layer and a part made of ferromagnetic material of the single magnetic domain turning ferromagnetic layer exists for the non-magnetic separating layer, a leakage magnetic field cannot be ignored. Therefore, it is desirable that the non-magnetic separating layer is thinner than 5 nm. In the meantime, it is known that when sandwich structure such as Co/Ru/Co (thickness of Ru: 0.8 nm for example) is formed using material such as Ru, Ir, Os, Re and Rh, strong antiferromagnetic coupling is produced between Co films. The magnitude of the antiferromagnetic coupling reaches a few kilo-oersted, that is, a few hundred kA/m. As in the invention, such strong antiferromagnetic coupling is undesirable, it is undesirable that the non-magnetic separating layer is formed by the material such as Ru having predetermined thickness such as 0.8 nm. In case material such as Ru is used for the non-magnetic separating layer for various reasons, antiferromagnetic coupling is eliminated by setting the thickness of the non-magnetic separating layer to 2 nm for example and characteristics based upon magnetostatic coupling at the end can be also acquired. Or the non-magnetic separating layer can be also formed by a layered structure such as an Ru layer/a Ta (Cu, Al, etc.) layer to prevent , or reduce, antiferromagnetic coupling from being produced by the Ru layer. In the meantime, when material such as Cr having specific thickness, the thickness of 0.9 to 1 nm for example is used, extremely weak antiferromagnetic coupling is produced between ferromagnetic layers via Cr. As the magnitude of the coupling in this case is slightly a few tens or hundreds oersted, that is, approximately a few kA/m and extremely weak, the object of the invention is not impaired.

The non-magnetic separating layer can also function as a protective film of the magnetoresistive layered film in case the non-magnetic separating layer is arranged on the magnetoresistive layered film. Recently, it is reported that when the protective film of the magnetoresistive layered film is formed by oxide or a laminated layer of metal and oxide, the rate of change of the resistance and others are enhanced. Even if the non-magnetic separating layer according to the invention has the above-mentioned configuration, that is, includes oxide or oxide and metal, the object of the invention is not impaired and it is desirable that suitable configuration is adopted.

According to the invention, in the magnetoresistive head using such material and having such configuration and the magnetic disk unit having this reading head, high density recording is realized, that is, recording at a short wavelength on a recording medium is realized, recording in narrow track width is realized and sufficient read output is acquired and recording can be kept satisfactory.

DESCRIPTION OF THE PREFERRED EMBODIMENTS

Figure 1:
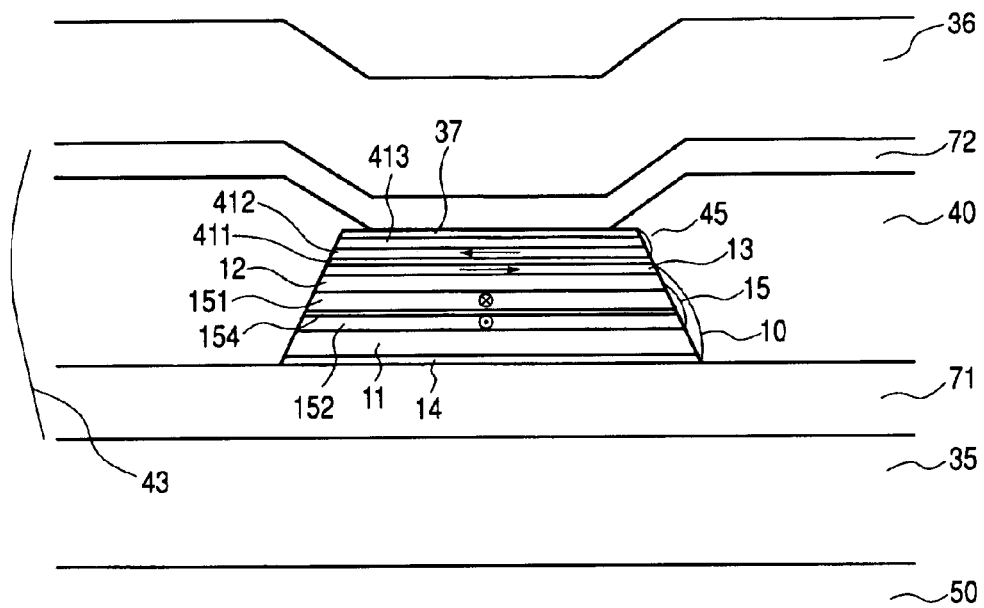
FIG. 1 shows a configurational example of a giant magnetoresistive head according to the invention.

A thin film for forming a giant magnetoresistive layered film according to the invention is produced by a radio frequency magnetron sputtering apparatus as follows. The following material is sequentially deposited on a ceramic substrate 1 mm thick in the 1 to 6-millitorr atmosphere of argon . For sputtering targets, tantalum, a nickel-iron (20 at %) alloy, copper, cobalt, MnPt, ruthenium, alumina, magnetite, MnIr and NiMn are used. 1 cm square chips of Fe and Ni are suitably arranged on Co to adjust the composition. Fe chips are arranged on magnetite target to adjust the composition of an Fe—O film. Each layer of a deposition film is sequentially formed by applying high-frequency power to a cathode in which each target is arranged to generate plasma in the apparatus and opening and closing a shutter arranged every cathode one by one. A magnetic field of approximately 80 oersted is applied in parallel with the substrate using a permanent magnet in forming a film to apply a uniaxial anisotropy. Heat treatment is applied to the formed film in a vacuum and a magnetic field at 270° C. for three hours to transform the phase of an MnPt antiferromagnetic film, the magnetoresistance at room temperature is measured and evaluated. In case an antiferromagnetic film except MnPt is used together, magnetizing heat treatment at different temperature is also performed. In the case of configuration using a hard magnetic film, after heat treatment, a magnetizing process is made at room temperature. The element on the substrate is formed by patterning in a photoresist process. Afterward, the substrate is set over a slider and is mounted in a magnetic disk unit.

To evaluate the configuration of magnetic domain control structure, magnetization process simulation according to Landau-Lifschutz-Gilbert (LLG) model is made, and the stability and the output of the magnetic head are compared and examined.

Referring to the drawings, concrete embodiments of the invention will be described below.

FIG. 1 shows an example of the configuration of a giant magnetoresistive head according to the invention. The giant magnetoresistive head is shown in a sectional view parallel to an opposite surface. FIG. 1 is a schematic drawing viewed from the opposite surface opposite to a magnetic medium. A lower magnetic shield 35 and a lower gap film 71 are formed on a substrate 50, a giant magnetoresistive layered film 10 is formed on them, further, an upper gap film 72 and an upper magnetic shield 36 are formed and a read gap 43 for detecting a read signal is formed. An electrode 40 is touched to both ends in a direction of track width of the giant magnetoresistive layered film 10, applies sense current and detects the magnetoresistive change. A method of forming the electrode 40 and the form are described based upon the structure produced according to a so-called lift-off system, however, another various methods can be utilized. The giant magnetoresistive layered film 10 has the following structure shown in FIG. 1.

An underlayer 14, an antiferromagnetic film 11, a ferromagnetic pinned layer 15, a non-magnetic conductive layer 12 and a soft magnetic free layer 13 are continuously formed. In this configuration example, the ferromagnetic pinned layer 15 is formed by a layered film composed of a first ferromagnetic film 151, a second ferromagnetic film 152 and an antiparallel coupling film 154. The antiparallel coupling film 154 has effect that applies exchange coupling for arraying the magnetization of the first ferromagnetic film 151 and the magnetization of the second ferromagnetic film 152 mutually in antiparallel and controls a substantial magnetization amount in the ferromagnetic pinned layer so that it is equivalent to difference between a magnetization amount in the first ferromagnetic film 151 and that in the second ferromagnetic film 152. Even if the ferromagnetic pinned layer 15 is formed by one magnetic substance or is formed by a layered film composed of two, four or more layers, the object of the invention is not impaired. The soft magnetic free layer 13 is formed by a lamination composed of a first free layer soft magnetic film and a second free layer soft magnetic film, however, even if the soft magnetic free layer 13 is formed by one magnetic substance or is formed by a layered film composed of two or more layers, the object of the invention is not impaired. Particularly, if the side close to the non-magnetic conductive layer 12 is formed by a Co alloy and the reverse side is formed by an Ni—Fe alloy, soft magnetic characteristics and a high rate of change of resistance are compatible. In the invention, a single magnetic domain turning ferromagnetic layer 45 is layered on the soft magnetic free layer 13 of the giant magnetoresistive layered film 10 and is formed so that it has substantially the same size in the direction of track width as the giant magnetoresistive layered film 10. The single magnetic domain turning ferromagnetic layer 45 is composed of a non-magnetic separating layer 411 which is in contact with the soft magnetic free layer 13, a ferromagnetic layer 412, an antiferromagnetic layer 413 and a protective film 37. Even if the protective film 37 is not provided, the object of the invention is not impaired.

The non-magnetic separating layer 411 disconnects magnetic junction between the soft magnetic free layer 13 and the ferromagnetic layer 412 and prevents both from a ferromagnetically coupled magnetization process. For the non-magnetic separating layer 411, a layer acquired by, for example, slightly oxidizing a layer 1 nm thick made of Ta and a film acquired by further depositing Ru, Cu and others can be used. The non-magnetic separating layer 411 or a part may also function as a protective film of the giant magnetoresistive layered film 10. The antiferromagnetic layer 413 is polarized in the direction of track width perpendicular to an external magnetic field and has a function for applying exchange coupling to the ferromagnetic layer 412 and setting the magnetization of the ferromagnetic layer 412 to the direction of track width in a state in which an external magnetic field is zero. The magnetization of the ferromagnetic layer 412 and the magnetization of the soft magnetic free layer 13 mutually become antiparallel by laminated the single magnetic domain turning ferromagnetic layer 45 on the soft magnetic free layer 13 of the giant magnetoresistive layered film 10 and forming the single magnetic domain turning ferromagnetic layer 45 so that it has substantially the same size as the giant magnetoresistive layered film 10 in the direction of track width, are magnetostatically coupled at the end in the direction of track width, a closed magnetic circuit is formed and the soft magnetic free layer 13 is turned a single magnetic domain. In case the end of the soft magnetic free layer 13 and the end of the ferromagnetic layer 412 are near enough, a magnetization amount in the soft magnetic free layer 13 and that in the ferromagnetic layer 412 may be substantially the same. As a magnetic effect of the ferromagnetic layer 412 decreases as far as the soft magnetic free layer when both are apart, a magnetization amount in the ferromagnetic layer is set so that it is more than a magnetization amount in the soft magnetic free layer.

As shown by arrows in FIG. 1, a direction of the magnetization of the soft magnetic free layer 13 becomes antiparallel to the magnetization of the single magnetic domain turning ferromagnetic layer 45, and magnetic anisotropy, the magnitude of detection current, a magnetization amount in the ferromagnetic pinned layer 15 and stripe height which is the size in depth of the element are set so that the direction of the magnetization of the soft magnetic free layer is substantially the direction of track width in a state in which an external magnetic field is zero so as to turn bias characteristics symmetrical.

Figure 2:
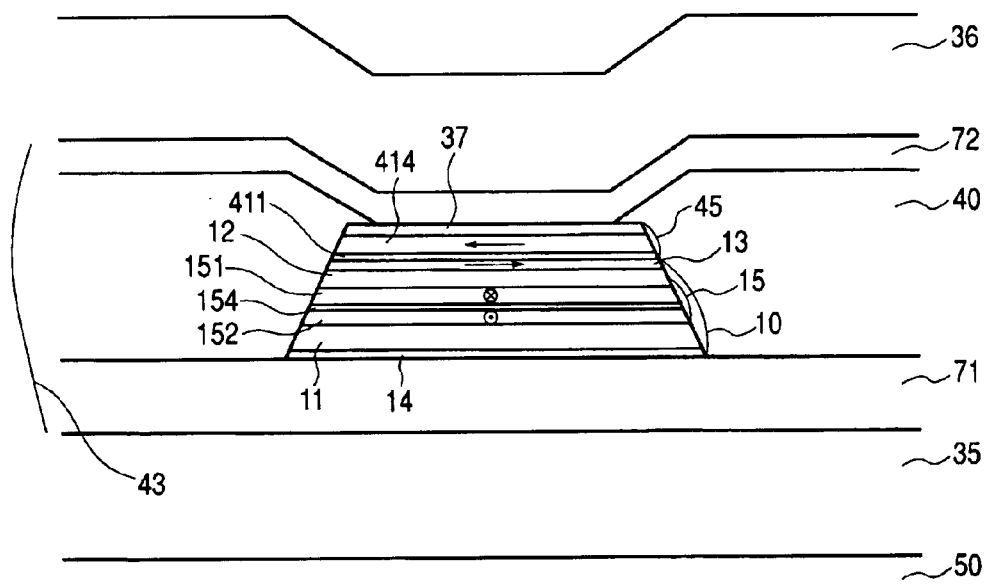
FIG. 2 shows another configurational example of the giant magnetoresistive head according to the invention.

FIG. 2 shows another configurational example showing the giant magnetoresistive head according to the invention. FIG. 2 is a schematic sectional view viewed from an opposite surface opposite to a magnetic medium. A lower magnetic shield 35 and a lower gap film 71 are formed on a substrate 50, a giant magnetoresistive layered film 10 is formed on them, further, an upper gap film 72 and an upper magnetic shield 36 are formed and a read gap 43 for detecting a read signal is formed. An electrode 40 is touched to both ends in a direction of track width of the giant magnetoresistive layered film 10, applies sense current and detects the variation of electric resistance. A method of forming the electrode 40 and the form are described based upon the structure produced according to a so-called lift-off system, however, another various methods can be utilized. The giant magnetoresistive layered film 10 has the following structure in FIG. 2 as in FIG. 1.

An underlayer 14, an antiferromagnetic film 11, a ferromagnetic pinned layer 15, a non-magnetic conductive layer 12 and a soft magnetic free layer 13 are continuously formed. In this configurational example, the ferromagnetic pinned layer 15 is formed by a deposition composed of a first ferromagnetic film 151, a second ferromagnetic film 152 and an antiparallel coupling film 154. The antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer is equivalent to difference between a magnetization amount in the first ferromagnetic film 151 and that in the second ferromagnetic film 152. Even if the ferromagnetic pinned layer 15 is formed by one magnetic substance or is formed by a layered composed of two, four or more layers, the object of the invention is not impaired. The soft magnetic free layer 13 is formed by a lamination composed of a first free layer soft magnetic film and a second free layer soft magnetic film, however, even if the soft magnetic free layer 13 is formed by one magnetic substance or is formed by a layered composed of two or more layers, the object of the invention is not impaired. Particularly, if the side close to the non-magnetic conductive layer 12 is formed by a Co alloy and the reverse side is formed by an Ni—Fe alloy, soft magnetic characteristics and a high rate of change of resistance are compatible. In the invention, a single magnetic domain turning ferromagnetic layer 45 is layered on the soft magnetic free layer 13 of the giant magnetoresistive layered film 10 and is formed so that it has substantially the same size in the direction of track width as the giant magnetoresistive layered film 10. The single magnetic domain turning ferromagnetic layer 45 is composed of a non-magnetic separating layer 411 which is in contact with the soft magnetic free layer 13, a hard magnetic layer 414 and a protective film 37. Even if the protective film 37 is not provided, the object of the invention is not impaired.

The non-magnetic separating layer 411 disconnects magnetic junction between the soft magnetic free layer 13 and the hard magnetic layer 414 and prevents both from a ferromagnetically coupled magnetization process. For the non-magnetic separating layer 411, a layer acquired by, for example, slightly oxidizing a layer 1 nm thick made of Ta and a film acquired by further depositing Ru, Cu and others can be used. The non-magnetic separating layer 411 or a part may also function as a protective film of the giant magnetoresistive layered film 10. The hard magnetic layer 414 is magnetizing in the direction of track width perpendicular to an external magnetic field and has a function for also setting the magnetization of the hard magnetic layer 414 to the direction of track width for an external magnetic field and disturbance. It is desirable that the coercivity of the hard magnetic layer 414 is 40 kA/m or more, particularly 160 kA/m or more to fulfill this function. The magnetization of the hard magnetic layer 414 and the magnetization of the soft magnetic free layer 13 mutually become antiparallel by laminating the single magnetic domain turning ferromagnetic layer 45 on the soft magnetic free layer 13 of the giant magnetoresistive layered film 10 and forming the single magnetic domain turning ferromagnetic layer so that it has substantially the same size in the direction of track width as the giant magnetoresistive layered film 10, are magnetostatically coupled at the end in the direction of track width, a closed magnetic circuit is formed and the soft magnetic free layer 13 is turned a single magnetic domain. In case the end of the soft magnetic free layer 13 and the end of the hard magnetic layer 414 are near enough, a magnetization amount in the soft magnetic free layer 13 and that in the hard magnetic layer 414 may be substantially the same. As a magnetic effect of the hard magnetic layer 414 decreases as far as the soft magnetic free layer 13 when both are apart, a magnetization amount in the hard magnetic layer is set so that it is more than a magnetization amount in the soft magnetic free layer 13.

As shown by arrows in FIG. 2, a direction of the magnetization of the soft magnetic free layer 13 becomes antiparallel to the magnetization of the single magnetic domain turning ferromagnetic layer 45, that is, the magnetization of the hard magnetic layer 414, and magnetic anisotropy, the magnitude of detection current, a magnetization amount in the ferromagnetic pinned layer 15 and stripe height which is the size in depth of the element are set so that the direction of the magnetization of the soft magnetic free layer is substantially the direction of track width in a state in which an external magnetic field is zero so as to turn bias characteristics symmetrical.

Figure 3:
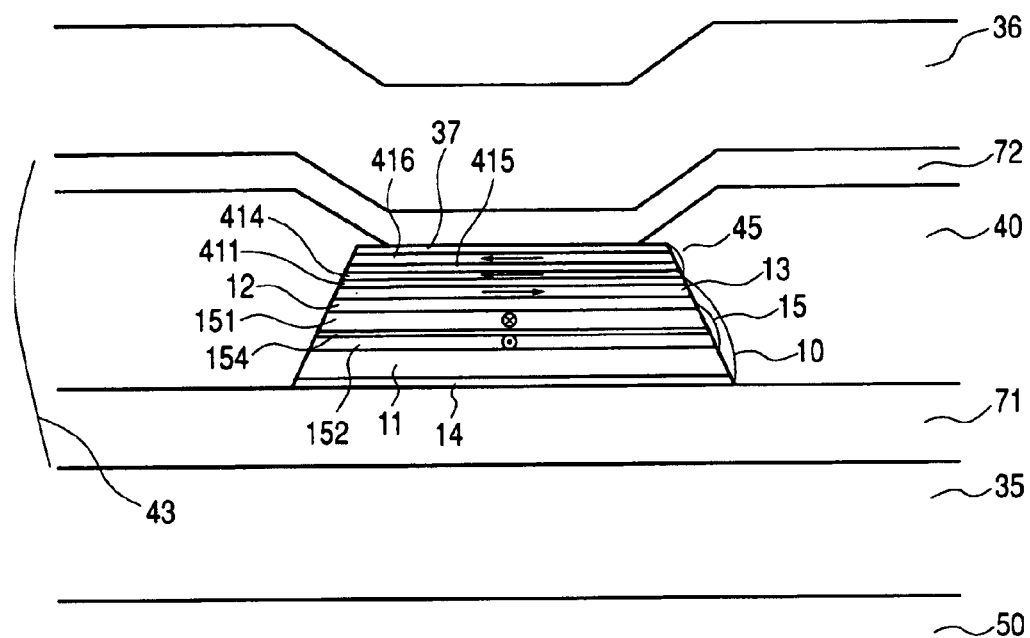
FIG. 3 shows further another configurational example of the giant magnetoresistive head according to the invention.

FIG. 3 shows further another configurational example showing the giant magnetoresistive head according to the invention. FIG. 3 is a schematic sectional view viewed from an opposite surface opposite to a magnetic medium. A lower magnetic shield 35 and a lower gap film 71 are formed on a substrate 50, a giant magnetoresistive layered film 10 is formed on them, further, an upper gap film 72 and an upper magnetic shield 36 are formed and a read gap 43 for detecting a read signal is formed. An electrode 40 is touched to both ends in a direction of track width of the giant magnetoresistive layered film 10, applies sense current and detects the magnetoresistance. A method of forming the electrode 40 and the form are described based upon the structure produced according to a so-called lift-off system, however, another various methods can be utilized. The giant magnetoresistive layered film 10 has the following structure in FIG. 3 as in FIGS. 1 and 2.

An underlayer 14, an antiferromagnetic film 11, a ferromagnetic pinned layer 15, a non-magnetic conductive layer 12 and a soft magnetic free layer 13 are continuously formed. In this configurational example, the ferromagnetic pinned layer 15 is formed by a deposition composed of a first ferromagnetic film 151, a second ferromagnetic film 152 and an antiparallel coupling film 154. The antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer is equivalent to difference between a magnetization amount in the first ferromagnetic film 151 and that in the second ferromagnetic film 152. Even if the ferromagnetic pinned layer 15 is formed by one magnetic substance or is formed by a layered composed of two, four or more layers, the object of the invention is not impaired. The soft magnetic free layer 13 is formed by a layered composed of a first free layer soft magnetic film and a second free layer soft magnetic film, however, even if the soft magnetic free layer 13 is formed by one magnetic substance or is formed by a layered composed of two or more layers, the object of the invention is not impaired. Particularly, if the side close to the non-magnetic conductive layer 12 is formed by a Co alloy and the reverse side is formed by an Ni—Fe alloy, soft magnetic characteristics and a high rate of change of resistance are compatible. In the invention, a single magnetic domain turning ferromagnetic layer 45 is laminated on the soft magnetic free layer 13 of the giant magnetoresistive layered film 10 and is formed so that it has substantially the same size in the direction of track width as the giant magnetoresistive layered film 10. The single magnetic domain turning ferromagnetic layer 45 is composed of a non-magnetic separating layer 411 which is in contact with the soft magnetic free layer 13, a soft magnetic buffer layer 416, a coupling layer 415, a hard magnetic layer 414 and a protective film 37. Even if the protective film 37 is not provided, the object of the invention is not impaired.

The non-magnetic separating layer 411 disconnects magnetic junction between the soft magnetic free layer 13 and the soft magnetic buffer layer 416 and prevents both from a ferromagnetically coupled magnetization process. For the non-magnetic separating layer 411, a layer acquired by, for example, slightly oxidizing a layer 1 nm thick made of Ta and a film acquired by further depositing Ru, Cu and others can be used. The non-magnetic separating layer 411 or a part may also function as a protective film of the giant magnetoresistive layered film 10. In this configurational example, the soft magnetic buffer layer 416 is ferromagnetically coupled to the hard magnetic layer 414 via the coupling layer 415 and the coupling layer 415 has a function for controlling this ferromagnetic coupling so that it has suitable magnitude. For the coupling layer 415, a film made of Ta, alumina and others can be used. The soft magnetic buffer layer 416 absorbs a magnetic field generated by the dispersion of the magnetization of the hard magnetic layer 414 and prevents the deterioration of the magnetic characteristics of the soft magnetic free layer 13.

The hard magnetic layer 414 is magnetizing in the direction of track width perpendicular to an external magnetic field and has a function for also setting the magnetization of the hard magnetic layer 414 and the magnetization of the soft magnetic buffer layer 416 to the direction of track width for an external magnetic field and disturbance. It is desirable that the coercivity of the hard magnetic layer 414 is 40 kA/m or more, particularly 160 kA/m or more to fulfill this function. The magnetization of the soft magnetic buffer layer 416, the magnetization of the hard magnetic layer 414 and the magnetization of the soft magnetic free layer 13 mutually become antiparallel by laminated the single magnetic domain turning ferromagnetic layer 45 on the soft magnetic free layer 13 of the giant magnetoresistive layered film 10 and forming the single magnetic domain turning ferromagnetic layer so that it has substantially the same size in the direction of track width as the giant magnetoresistive layered film 10, are magnetostatically coupled at the end in the direction of track width, the total magnetization forms a closed magnetic circuit and the soft magnetic free layer 13 is turned a single magnetic domain. In case the end of the soft magnetic free layer 13, the end of the soft magnetic buffer layer 416 and the end of the hard magnetic layer 414 are near enough, a magnetic effect in the soft magnetic free layer 13 and the total of a magnetization amount in the soft magnetic buffer layer 416 and that in the hard magnetic layer 414 may be substantially the same. As the total of a magnetic effect in the soft magnetic buffer layer 416 and that in the hard magnetic layer 414 decreases as far as the soft magnetic free layer 13 when both are apart, the total is set so that it is more than a magnetization amount in the soft magnetic free layer 13.

As shown by arrows in FIG. 3, a direction of the magnetization of the soft magnetic free layer 13 becomes antiparallel to the magnetization of the single magnetic domain turning ferromagnetic layer 45, that is, the magnetization of the soft magnetic buffer layer 416 and that of the hard magnetic layer 414, and magnetic anisotropy, the magnitude of detection current, a magnetization amount in the ferromagnetic pinned layer 15 and stripe height which is the size in depth of the element are set so that the direction of the magnetization of the soft magnetic free layer is substantially the direction of track width in a state in which an external magnetic field is zero so as to turn bias characteristics symmetrical.

Figure 4:
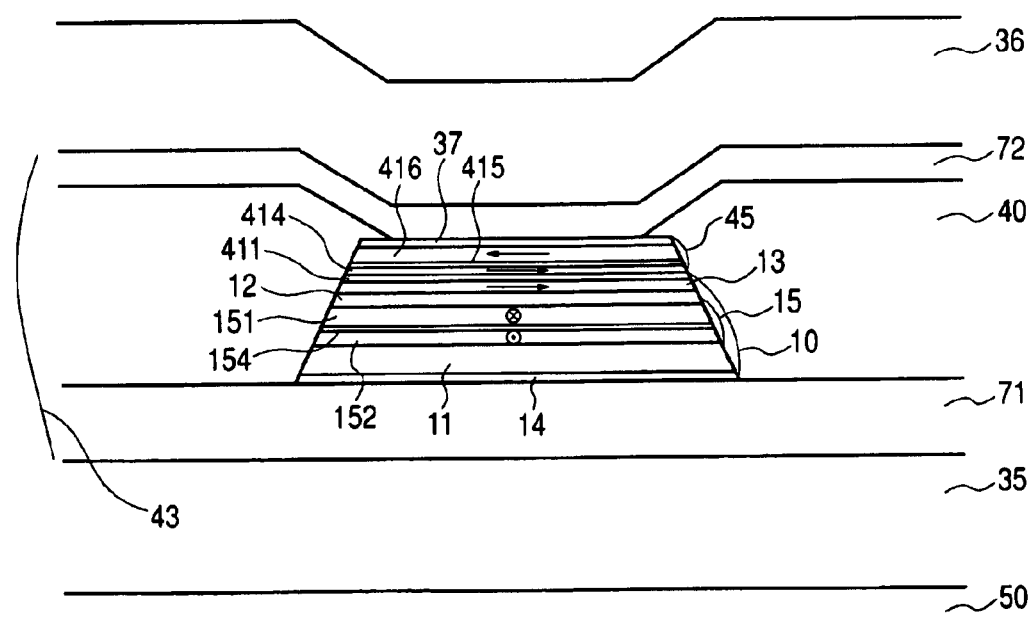
FIG. 4 shows furthermore another configurational example of the giant magnetoresistive head according to the invention.

FIG. 4 shows furthermore another configurational example showing the giant magnetoresistive head according to the invention. FIG. 4 is a schematic sectional view viewed from an opposite surface opposite to a magnetic medium. A lower magnetic shield 35 and a lower gap film 71 are formed on a substrate 50, a giant magnetoresistive layered film 10 is formed on them, further, an upper gap film 72 and an upper magnetic shield 36 are formed and a read gap 43 for detecting a read signal is formed. An electrode 40 is touched to both ends in a direction of track width of the giant magnetoresistive layered film 10, applies sense current and detects the magnetoresistance. A method of forming the electrode 40 and the form are described based upon the structure produced according to a so-called lift-off system, however, another various methods can be utilized. The giant magnetoresistive layered film 10 has the following structure in FIG. 4 as in FIGS. 1 to 3.

An underlayer 14, an antiferromagnetic film 11, a ferromagnetic pinned layer 15, a non-magnetic conductive layer 12 and a soft magnetic free layer 13 are continuously formed. In this configurational example, the ferromagnetic pinned layer 15 is formed by a deposition composed of a first ferromagnetic film 151, a second ferromagnetic film 152 and an antiparallel coupling film 154. The antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer is equivalent to difference between a magnetization amount in the first ferromagnetic film 151 and that in the second ferromagnetic film 152. Even if the ferromagnetic pinned layer 15 is formed by one magnetic body or is formed by a layered composed of two, four or more layers, the object of the invention is not impaired. The soft magnetic free layer 13 is formed by a laminated composed of a first free layer soft magnetic film and a second free layer soft magnetic film, however, even if the soft magnetic free layer 13 is formed by one magnetic body or is formed by a laminated composed of two or more layers, the object of the invention is not impaired. Particularly, if the side close to the non-magnetic conductive layer 12 is formed by a Co alloy and the reverse side is formed by an Ni—Fe alloy, soft magnetic characteristics and a high rate of change of resistance are compatible. In the invention, a single magnetic domain turning ferromagnetic layer 45 is laminated on the soft magnetic free layer 13 of the giant magnetoresistive layered film 10 and is formed so that it has substantially the same size in the direction of track width as the giant magnetoresistive layered film 10. The single magnetic domain turning ferromagnetic layer 45 is composed of a non-magnetic separating layer 411 which is in contact with the soft magnetic free layer 13, a soft magnetic buffer layer 416, a coupling layer 415, a hard magnetic layer 414 and a protective film 37.

Even if the protective film 37 is not provided, the object of the invention is not impaired.

The non-magnetic separating layer 411 disconnects magnetic junction between the soft magnetic free layer 13 and the soft magnetic buffer layer 416 and prevents both from following a ferromagnetically coupled magnetization process. For the non-magnetic separating layer 411, a layer acquired by , for example, slightly oxidizing a layer 1 nm thick made of Ta and a film acquired by further depositing Ru, Cu and others can be used. The non-magnetic separating layer 411 or a part may also function as a protective film of the giant magnetoresistive layered film 10. This configurational example and that shown in FIG. 3 are different in a direction of the magnetization of the coupling layer 415 and that of the soft magnetic buffer layer 416. In this configurational example, the soft magnetic buffer layer 416 is antiferromagnetically coupled to the hard magnetic layer 414 via the coupling layer 415 and the coupling layer 415 has a function for generating this antiferromagnetic coupling. For the coupling layer 415, a film made of Ru, Ir and others and having predetermined thickness can be used. The soft magnetic buffer layer 416 absorbs a magnetic field generated by the dispersion of the magnetization of the hard magnetic layer 414 and prevents the deterioration of the magnetic characteristics of the soft magnetic free layer 13.

The hard magnetic layer 414 is polarized in the direction of track width perpendicular to an external magnetic field and has a function for also setting the magnetization of the hard magnetic layer 414 and the magnetization of the soft magnetic buffer layer 416 to the direction of track width for an external magnetic field and disturbance. It is desirable that the coercivity of a laminated film composed of the hard magnetic layer 414 and the soft magnetic buffer layer 416 is 40 kA/m or more, particularly 160 kA/m or more to fulfill this function. The magnetization of the hard magnetic layer 414, the magnetization of the soft magnetic buffer layer 416 and the magnetization of the soft magnetic free layer 13 mutually become antiparallel by depositing the single magnetic domain turning ferromagnetic layer 45 on the soft magnetic free layer 13 of the giant magnetoresistive layered film 10 and forming the single magnetic domain turning ferromagnetic layer so that it has substantially the same size in the direction of track width as the giant magnetoresistive layered film 10, are magnetostatically coupled at the end in the direction of track width, the total magnetization forms a closed magnetic circuit and the soft magnetic free layer 13 is turned a single magnetic domain. In case the end of the soft magnetic free layer 13, the end of the soft magnetic buffer layer 416 and the end of the hard magnetic layer 414 are near enough, a magnetization amount in the soft magnetic free layer 13, a magnetization amount in the hard magnetic layer 414 and that in the soft magnetic buffer layer 416 may be substantially the same. As a magnetic effect in the hard magnetic layer 414 decreases as far as the soft magnetic free layer 13 when the ends are apart, difference between a magnetization amount in the hard magnetic layer 414 and that in the soft magnetic buffer layer 416 is set so that it is more than a magnetization amount in the soft magnetic free layer 13. As shown by arrows in FIG. 3, a direction of the magnetization of the soft magnetic free layer 13 and the soft magnetic buffer layer 416 becomes antiparallel to the magnetization of the hard magnetic layer 414, and magnetic anisotropy, the magnitude of detection current, a magnetization amount in the ferromagnetic pinned layer 15 and stripe height which is the size in depth of the element are set so that the direction of the magnetization of the soft magnetic free layer and the soft magnetic buffer layer is substantially the direction of track width in a state in which an external magnetic field is zero so as to turn bias characteristics symmetrical.

Referring to FIGS. 5 to 8, a magnetic head having the structure according to the prior art will be described below for comparison.

Figure 5:
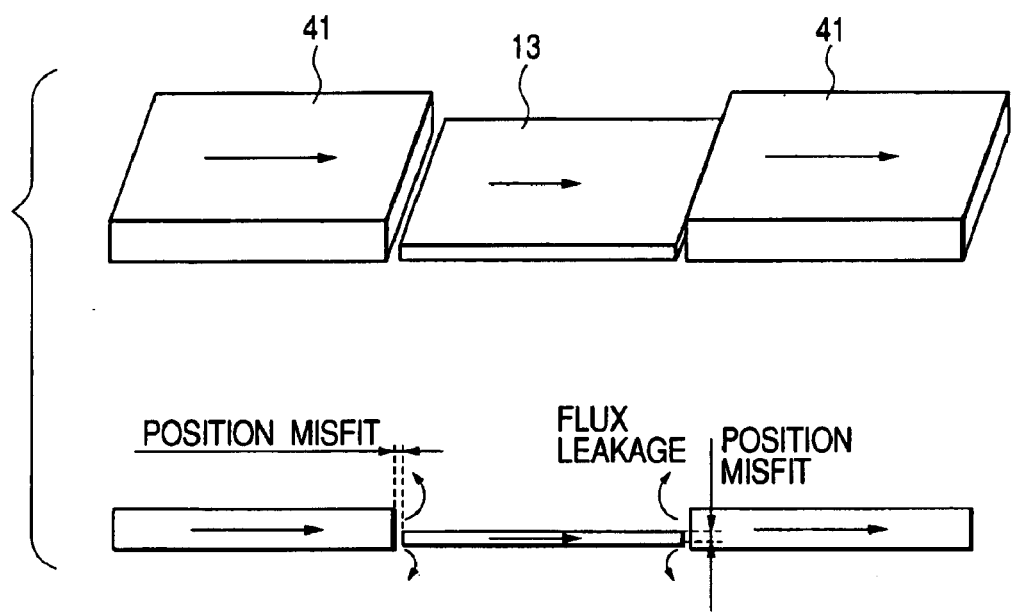
FIG. 5 shows schematic configuration and magnetization states of a magnetoresistive element of a magnetic head having conventional type hard-bias structure.
Figure 6:
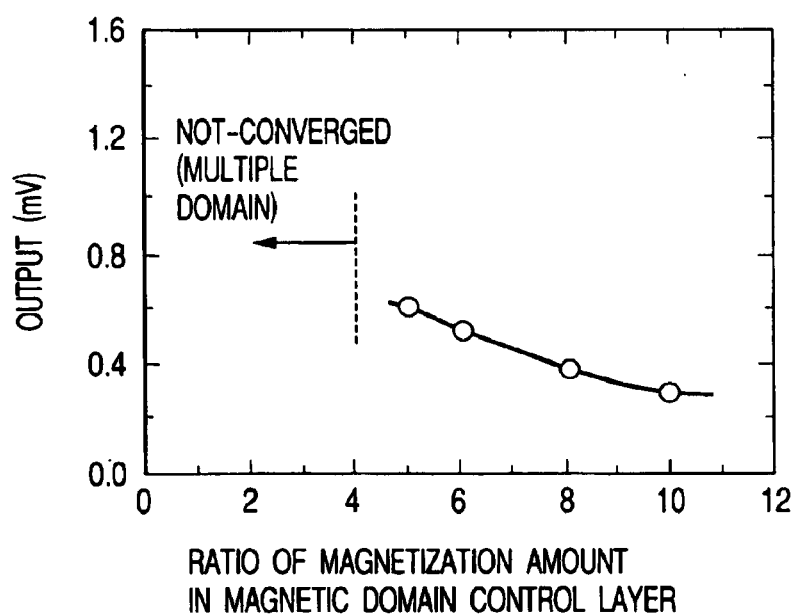
FIG. 6 shows the result of calculation showing relation between a magnetization amount in a magnetic domain control film having the conventional type hard-bias structure and the output of the head.

FIG. 5 shows magnetization of a magnetoresistive element of a magnetic head having conventional type hard-bias structure. The upper drawing in FIG. 5 is a perspective view and the lower drawing in FIG. 5 is viewed from a direction of the section. A magnetic domain control film 41 is formed by a hard magnetic film or a magnetic film having residual magnetization, is adjacent to a soft magnetic free layer 13 in a giant magnetoresistive layered film and has a function for applying bias effect for turning a single magnetic domain to he soft magnetic free layer 13. Ideally, it is desirable that a magnetization amount in the soft magnetic free layer 13 and that in the magnetic domain control film 41 or both amounts of residual magnetization are substantially the same and eliminate a magnetostatic field at the mutual end, however, actually as misregistration shown in the lower drawing in FIG. 5 is caused in the manufacture, a magnetization amount in the magnetic domain control film 41 is required to be set to a few times or more of a magnetization amount in the soft magnetic free layer 13 to stably turn the soft magnetic free layer 13 a single magnetic domain. FIG. 6 shows the calculation result of relation between a magnetization amount in the magnetic domain control film having the conventional type hard-bias structure and the output of the head. It is known that when a magnetization amount in the magnetic domain control film becomes approximately ten times of a magnetization amount in the soft magnetic free layer, it becomes difficult to magnetize the soft magnetic free layer according to an external magnetic field because of excessive single magnetic domain turning bias and the output of the head is low. The narrower track width is, the more remarkable the deterioration of the output of the head becomes and this is extremely important in a magnetic head of high recording density. When a magnetization amount in the magnetic domain control film is reduced, the output increases because excessive single magnetic domain turning bias is reduced, however, when a magnetization amount in the magnetic domain control film becomes approximately five times or less of a magnetization amount in the soft magnetic free layer, the calculation according to LLG does not converge and the result is not acquired. This reason is that the soft magnetic free layer becomes a state that multiple magnetic domains exist and a fixed equilibrium state is not acquired in calculation, that is, it is shown that in the hard-bias structure, when a magnetization amount in the magnetic domain control film is a few times or less of a magnetization amount in the soft magnetic free layer, the output of the magnetic head is unstable. Therefore, it is known that in the hard-bias structure, sufficient output is not stably acquired in a narrow track.

Figure 7:
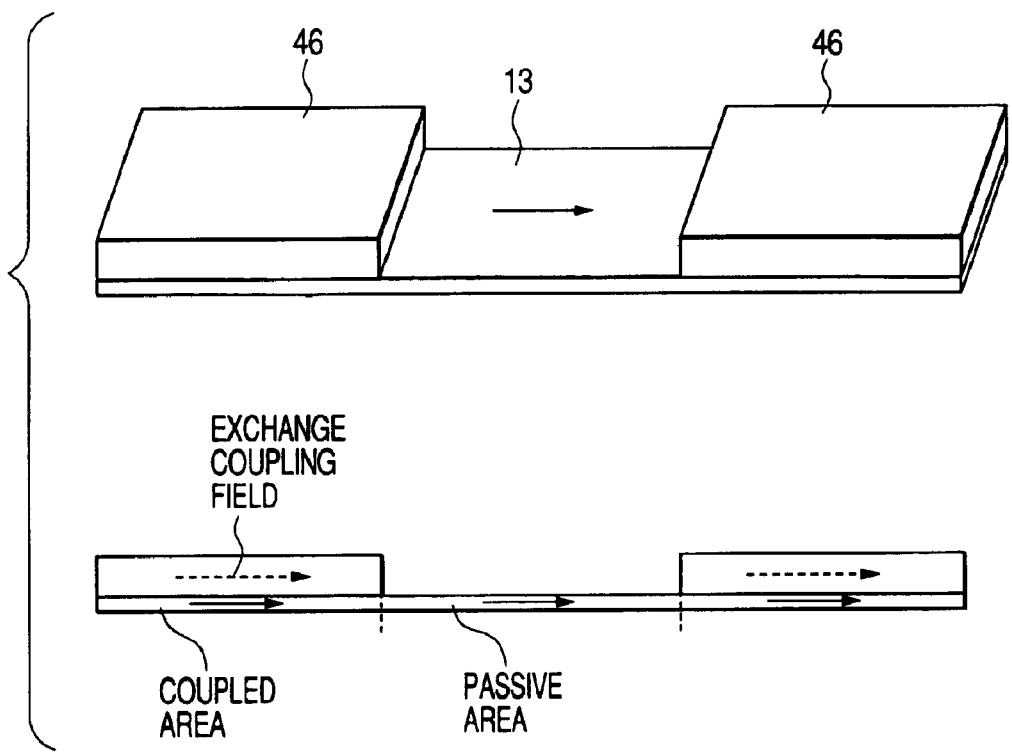
FIG. 7 shows schematic configuration and magnetization states of a magnetoresistive element of a magnetic head having patterned exchange structure in prior art.
Figure 8:
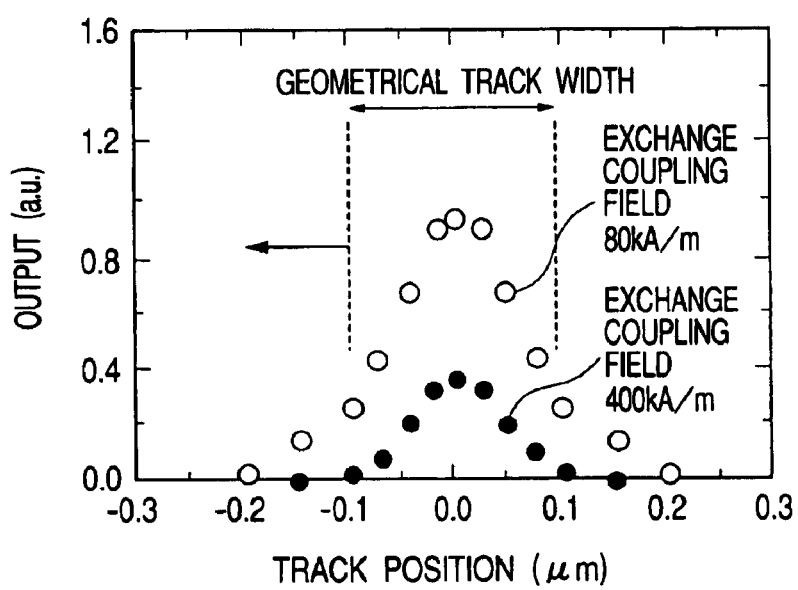
FIG. 8 shows the result of calculation showing relation between an exchange coupling magnetic field in the patterned exchange structure in the prior art and a microtrack curve.

Similarly, FIG. 7 shows schematic configuration and magnetization states of a magnetoresistive element of a magnetic head having patterned exchange structure according to prior art. An upper drawing in FIG. 7 is a perspective view and a lower drawing in FIG. 7 is a sectional view viewed from a direction of the section. A soft magnetic free layer 13 is formed so that it is wider than track width, an antiferromagnetic film 46 is touched to a part outside track width of the soft magnetic free layer 13 and is deposited on the part of the soft magnetic free layer, applies an exchange coupling field to a region in which no magnetic field is sensed of the soft magnetic free layer 13 and magnetically regulates track width. That is, an interval between the antiferromagnetic films 46 at both ends of the soft magnetic free layer 13 defines track width. In this structure, a problem such as misregistration and the increase of a magnetization amount in the hard-bias structure is not caused, however, it is known from simulation that another problem exists. Ideally, track width is defined by an interval between the antiferromagnetic films 46 at both ends of the soft magnetic free layer 13, however, actually, a part of the soft magnetic free layer pinned by the exchange coupling field of the antiferromagnetic film 46 and a part in the central magnetic region of the soft magnetic free layer 13 mutually interfere. FIG. 8 shows the calculation result of relation between an exchange coupling field in the patterned exchange structure according to the prior art and a microtrack curve. In case an exchange coupling field is 400 kA/m and large enough, the magnetization of the region in which no magnetic field is sensed of the soft magnetic free layer is pinned, does not contribute to output and a narrow and satisfactory microtrack curve is acquired. However, the output is low. This reason is that the pinned magnetization of the region in which no magnetic field is sensed and the magnetization of the soft magnetic free layer in a central magnetic field sensing region in the vicinity mutually act magnetostatically and in exchange coupling and the efficiency according to an external magnetic field of the central magnetic field sensing region near the end is deteriorated. Therefore, it is known that the narrower track width is, the stronger such an effect is. In the meantime, as a result of reducing an exchange coupling field up to 80 kA/m, high output is acquired, however, a microtrack curve becomes wider than track width set to an interval between the antiferromagnetic films. This reason is that as a result of setting an exchange coupling field to a low value, the soft magnetic free layer in the region in which no output should be sensed under the antiferromagnetic films is magnetized by an external magnetic field contrary to the output efficiency of the soft magnetic free layer in the central sensing region is not reduced, so-called "reading bleeding" occurs. As described above, it is known that in the patterned exchange structure of a narrow track, sufficient output and resolution in the direction of track width are not simultaneously acquired because when an exchange coupling field of the antiferromagnetic film at the end is set to a large value, output is deteriorated and when the exchange coupling field is set to a small value, "reading bleeding" occurs.

Figure 9:
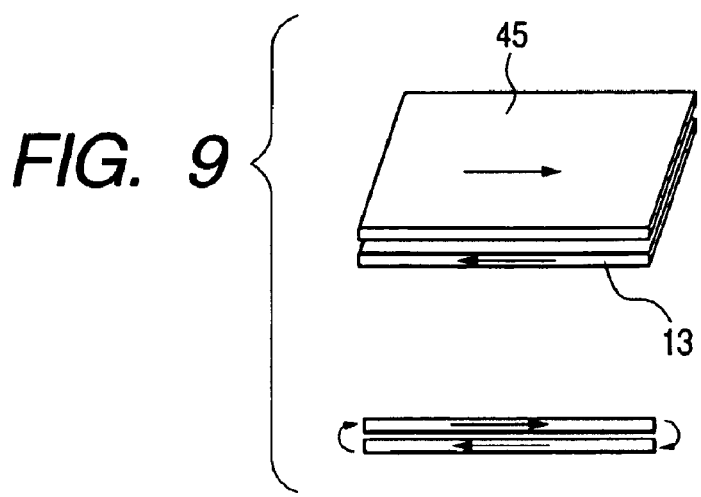
FIG. 9 shows schematic configuration and magnetization states of a magnetoresistive element of a magnetic head having closed magnetic circuit magnetic domain control structure according to the invention.
Figure 10:
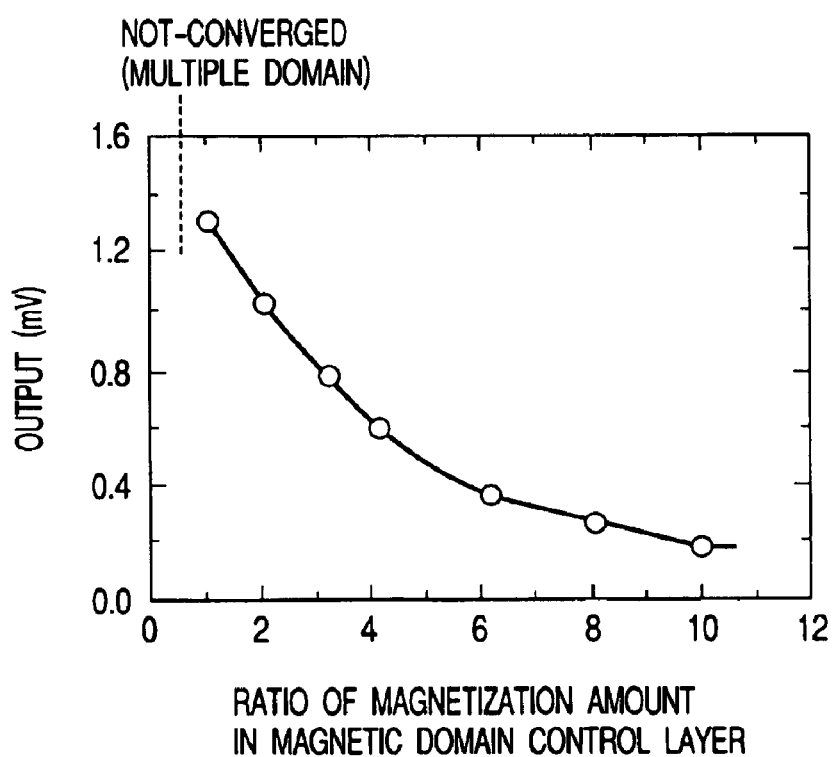
FIG. 10 shows the result of calculation showing relation between a magnetization amount in a single magnetic domain turning ferromagnetic layer of the magnetic head having the closed magnetic circuit magnetic domain control structure according to the invention and the output of the head.
Figure 11:
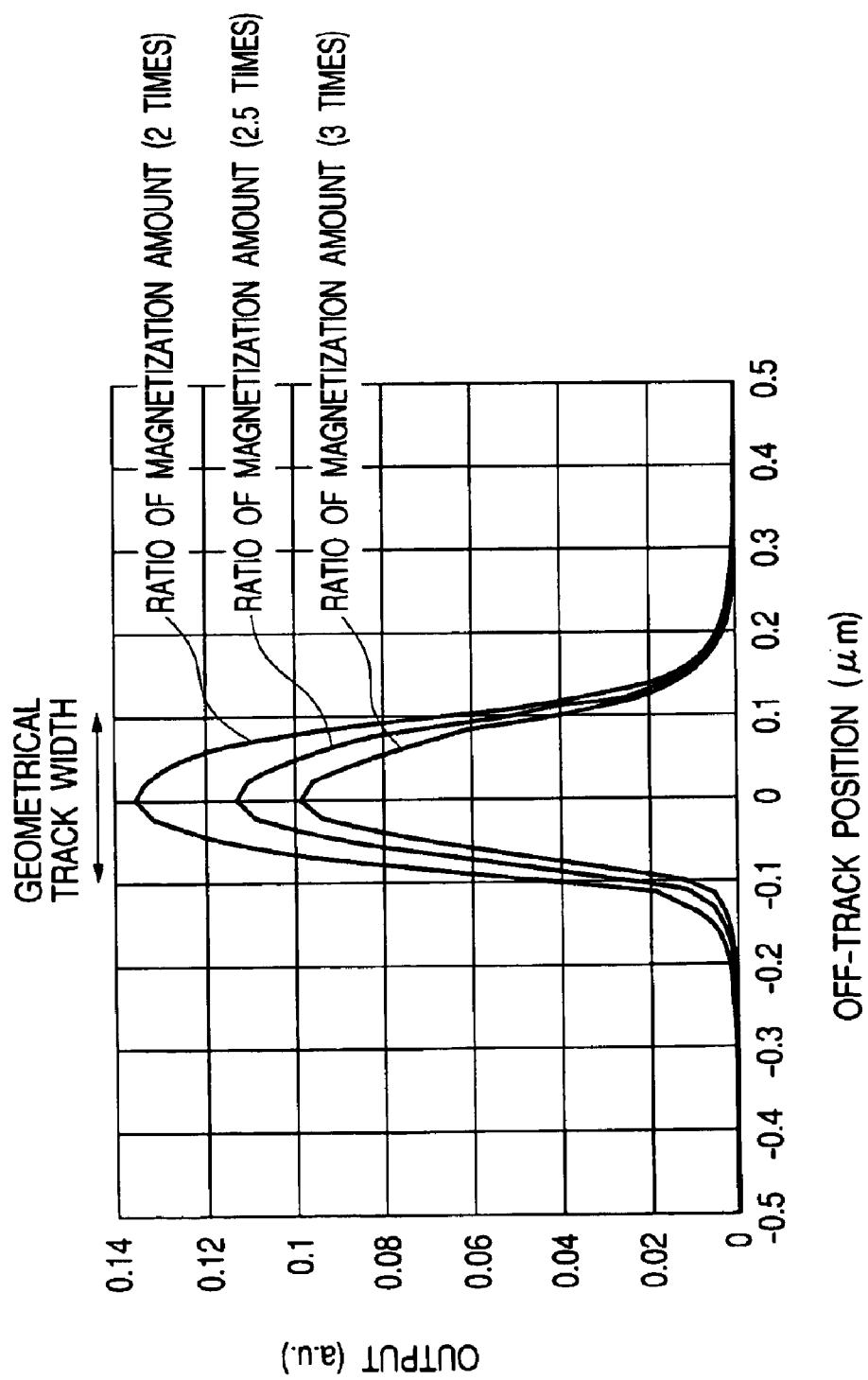
FIG. 11 shows the result of calculation of a microtrack curve of the magnetic head having the closed magnetic circuit magnetic domain control structure according to the invention.

FIG. 9 shows magnetization of the magnetoresistive element of the magnetic head having closed magnetic circuit magnetic domain control structure according to the invention. An upper drawing in FIG. 9 is a perspective view and a lower drawing in FIG. 9 is viewed from a direction of the section. The single magnetic domain turning ferromagnetic layer 45 is formed by the ferromagnetic film to which exchange coupling is applied by the antiferromagnetic film, the hard magnetic film or the magnetic film having residual magnetization and others and laminated as state of disconnecting magnetic junction with the soft magnetic free layer 13 in the giant magnetoresistive layered film and applying bias effect for turning a single magnetic domain to the soft magnetic free layer 13. Differently from the hard-bias structure, ideally, a magnetization amount in the soft magnetic free layer 13 and a magnetization amount in the single magnetic domain turning ferromagnetic layer 45 are substantially equalized and a static magnetic field at the mutual ends can be offset. This reason is that as the structure according to the invention is a laminated and is formed in substantially the same track width, no misregistration occurs at each end of the soft magnetic free layer 13 and the single magnetic domain turning ferromagnetic layer 45 and only a gap equivalent to approximately the thickness of the film put between them is formed. A magnetization amount in the single magnetic domain turning ferromagnetic layer 45 is set to a slightly larger value than that of the soft magnetic free layer 13 and can be also more stably designed. FIG. 10 shows the calculation result of relation between a magnetization amount in the single magnetic domain turning ferromagnetic layer of the magnetic head having the closed magnetic circuit magnetic domain control structure according to the invention and the output of the head. It is known that stable output is acquired in a wide range from a region in which a magnetization amount in the single magnetic domain turning ferromagnetic layer is large to a region in which it is small and high output can be stably acquired by reducing a magnetization amount in the single magnetic domain turning ferromagnetic layer up to a value equal to a magnetization amount in the soft magnetic free layer. A tendency that the output of the head is not deteriorated even if track width is narrowed, compared with that in prior art is remarkable and is extremely important in a high recording density magnetic head. Further, when a magnetization amount in the single magnetic domain turning ferromagnetic layer is reduced until it is smaller than a magnetization amount in the soft magnetic free layer, the calculation according to LLG does not converge and the result is not acquired. This reason is that the soft magnetic free layer becomes a state in which multiple magnetic domains exist and a fixed equilibrium state is not acquired in calculation. In the conventional type hard-bias structure, a magnetization amount in the magnetic domain control film becomes a state in which multiple magnetic domains exist with a smaller value than five times of a magnetization amount in the soft magnetic free layer, however, in the structure according to the invention, a magnetization amount in the single magnetic domain turning ferromagnetic layer can be kept a state of a single magnetic domain up to a magnetization amount in the soft magnetic free layer and therefore, in narrow track width, output higher by a few times than output in the hard-bias structure can be stably acquired. FIG. 11 shows the calculation result of a microtrack curve of the magnetic head having the closed magnetic circuit magnetic domain control structure according to the invention. FIG. 11 shows the result of varying a magnetization amount in the single magnetic domain turning ferromagnetic layer according to the ratio to a magnetization amount in the soft magnetic free layer. As the soft magnetic free layer is patterned so that it is the size of track width and further, there is no deterioration of efficiency due to magnetic flux leakage from the end owing to the closed magnetic circuit magnetic domain control structure, it is known that a microtrack curve of the magnetic head according to the invention is extremely abrupt at the end though geometrical track width is 0.18 μm and narrow and satisfactory characteristics and high output are shown. It is known that even if a magnetization amount in the single magnetic domain turning ferromagnetic layer is set to three times of that in the soft magnetic free layer, the width of the microtrack curve hardly varies and the deterioration of output is smaller, compared with that in the conventional type hard-bias structure. It is known that as described above, stable and high output in which no "reading bleeding" occurs can be achieved in the magnetic head of a narrow track by the structure according to the invention. It is known that as a result of similar calculation every track width, the magnetic head according to the invention has higher output and resolution than that in the conventional type structure in a region in which track width is narrower than 0.2 μm and until track width is 0.1 μm or less, approximately 0.05 μm, the magnetic head has high output.

Figure 12:
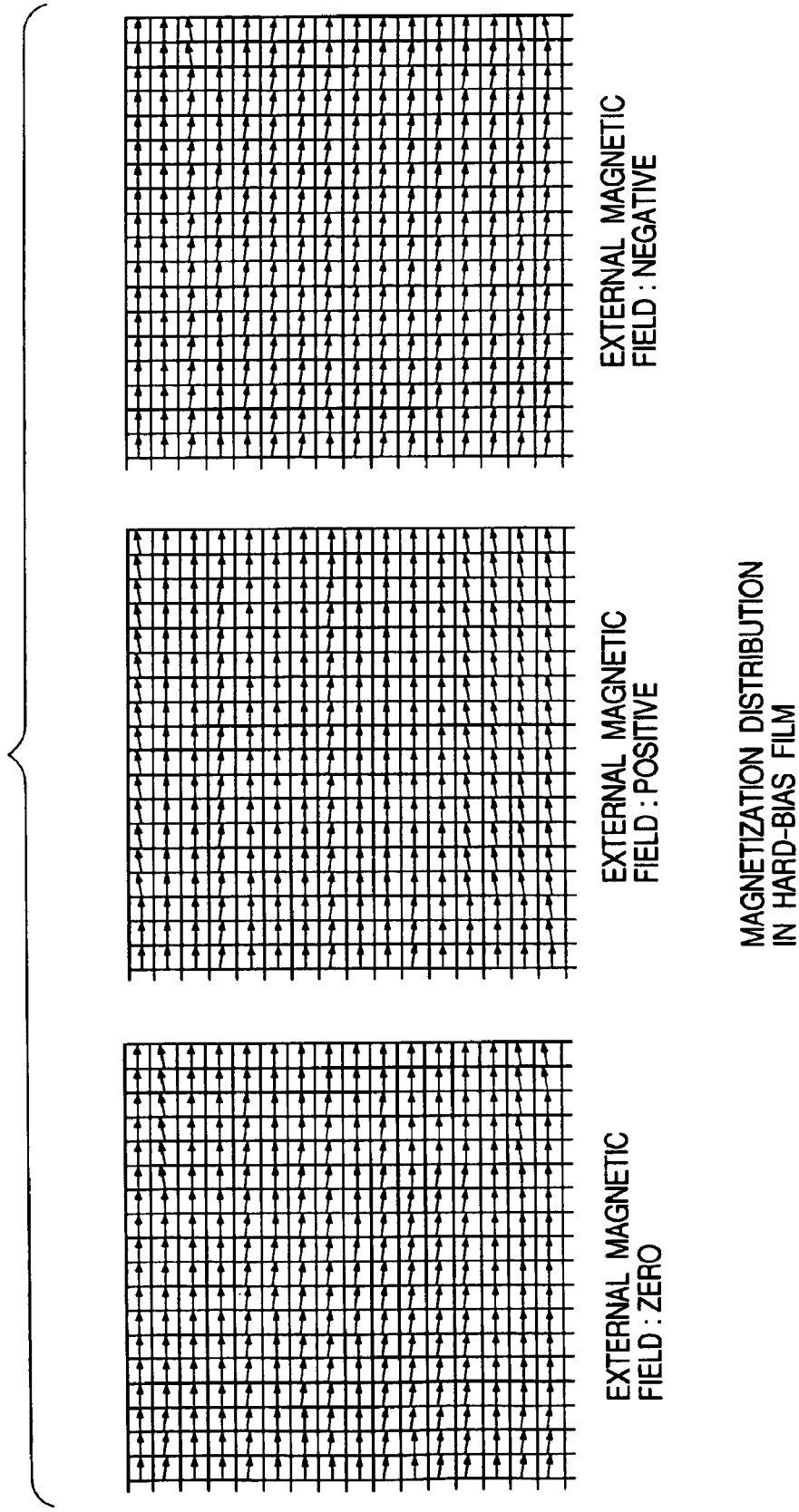
FIG. 12 shows the result of calculation of the magnetization distribution of a soft magnetic free layer in the hard-bias structure in the prior art.
Figure 13:
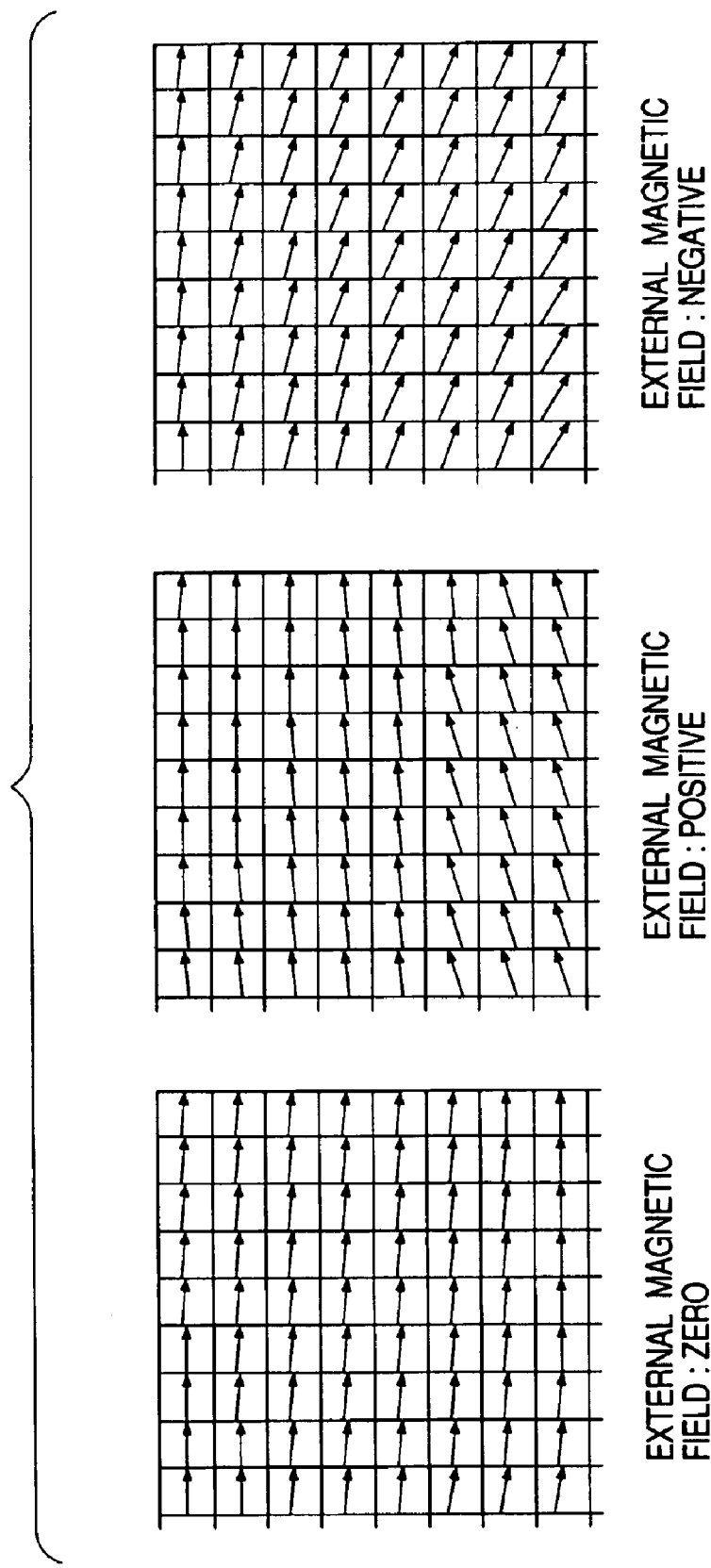
FIG. 13 shows the result of calculation of the magnetization distribution of a soft magnetic free layer in the closed magnetic circuit magnetic domain control structure according to the invention.

FIGS. 12 and 13 show difference in magnetization distribution between the hard-bias structure in prior art and the structure according to the invention and the cause of the above-mentioned characteristic will be described. FIG. 12 shows the calculation result of the magnetization distribution of the soft magnetic free layer in the hard-bias structure in prior art. The result of calculation in case the geometrical track width is 0.18 μm and the stripe height is 0.16 μm is shown every 0.1 μm. Each arrow shows a direction of magnetization in that location. Three distribution charts show the distribution of magnetization in case an external magnetic field is respectively zero, positive and negative and plainly, it may be said that difference in the turn of an arrow between a case that an external magnetic field is positive and a case that an external magnetic field is negative shows the height of magnetic field efficiency in each magnetization part. FIG. 12 shows that the distribution of magnetization in the hard-bias structure in prior art greatly deviates from a direction of track width (a just lateral direction in FIG. 12) in the center of track width and magnetization is turned by an external magnetic field, that is, it is efficient. In the meantime, it is known that in the vicinity of the end of track width, an arrow does not deviate so much from the direction of track width and magnetization is not turned by an external magnetic field, that is, efficiency is deteriorated. As the output of the magnetoresistive head is equivalent to the total of the magnetization distribution of these soft magnetic free layers, the efficiency of the magnetic head having the hard-bias structure is deteriorated when track width is narrow. In the meantime, FIG. 13 shows the calculation result of the magnetization distribution of the soft magnetic free layer in the closed magnetic circuit magnetic domain control structure according to the invention. As in FIG. 12, each arrow shows a direction of magnetization in that location. The result of calculation in case geometrical track width is 0.18 μm and the stripe height is 0.16 μm is shown every 0.2 μm. It is shown that magnetization distribution greatly deviates from the direction of track width (a just lateral direction in FIG. 13) everywhere in the center and at the end of track width and magnetization is turned by an external magnetic field, that is, efficiency is high. As the output of the magnetoresistive head is equivalent to the total of the magnetization distribution of these soft magnetic free layers, the magnetic head having the closed magnetic circuit magnetic domain control structure according to the invention does not have the deterioration caused at the end of efficiency even if track width is narrow, and stable output and abrupt microtrack characteristics can be achieved.

Figure 14:
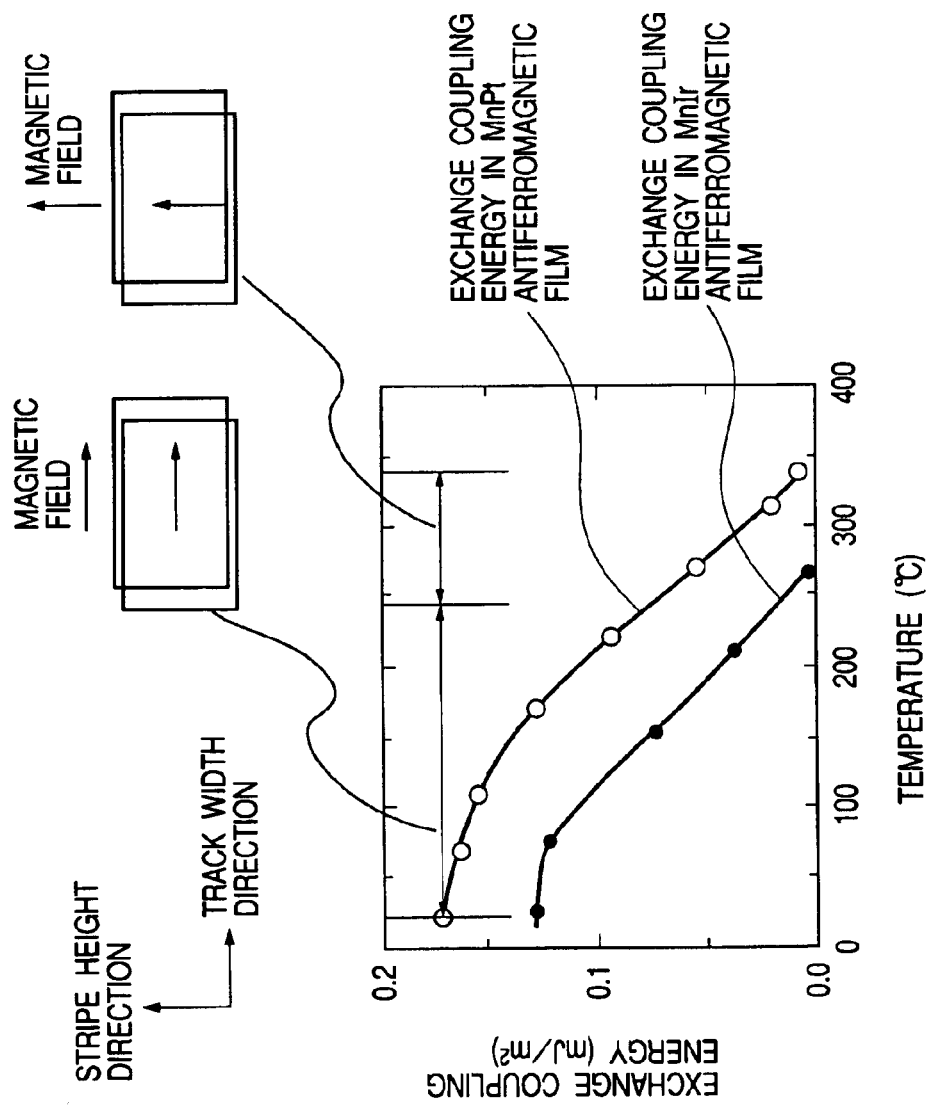
FIG. 14 shows an example of a method of magnetizing the magnetic head according to the invention.

FIG. 14 shows an example of a method of magnetizing the magnetic head according to the invention. In case the antiferromagnetic film is used for pinning the magnetization of the ferromagnetic pinned layer of the giant magnetoresistive effect film as in the configurational example according to the invention shown in FIG. 1 and the magnetization of the single magnetic domain turning ferromagnetic layer is pinned by the antiferromagnetic film, mutual exchange coupling fields are respectively required to be set to a direction of stripe height and a direction of track width. A lower drawing in FIG. 14 shows the dependency upon temperature of exchange coupling energy in case antiferromagnetic films different in a type and respectively made of MnPt and MnIr are used. The MnIr film shows blocking temperature of approximately 250° C., that is, the upper limit temperature of an exchange coupling field, however, the MnPt film shows blocking temperature of approximately 330° C. further higher. When heat treatment at 270° C. is applied to the MnPt film in a predetermined magnetic field, the MnPt film is cooled up to approximately 230° C. and afterward, is cooled up to room temperature in a magnetic field in a different direction, utilizing the above-mentioned difference of temperature characteristics, the MnPt film and the MnIr film can be respectively polarized so that the exchange coupling of the MnPt film is in a direction of the first magnetic field and the exchange coupling of the MnIr film is in a direction of the magnetic field in cooling up to room temperature. It is known that as described above, if the type of the antiferromagnetic film is changed and a temperature range is suitably selected, the directions of respective exchange coupling fields can be polarized in different directions.

Figure 15:
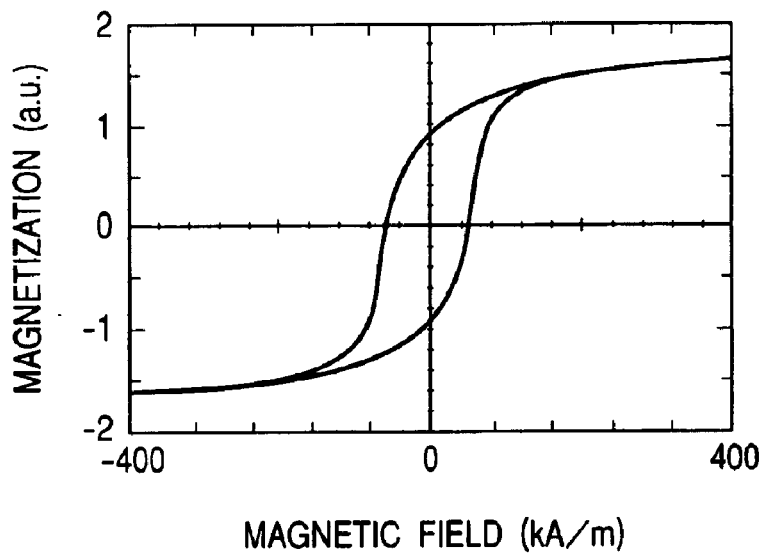
FIG. 15 shows a magnetization curve of a magnetite film.

FIG. 15 shows the magnetization curve of a film made of magnetite. The film has the thickness of 10 nm, the electric resistance is 5000 microohm·cm or more and the coercivity is 40 kA/m or more. When such a magnetic film having high electric resistance is used for the single magnetic domain turning ferromagnetic layer according to the invention, a magnetic head having the high rate of change of resistance, that is, having higher output can be acquired. For the single magnetic domain turning ferromagnetic layer, the ferromagnetic layer 412 shown in FIG. 1, the hard magnetic layers 414 shown in FIGS. 2, 3 and 4 and further, the soft magnetic buffer layers 416 shown in FIGS. 3 and 4 may be used. For a method of forming the magnetite film, it is desirable that a thin film is formed using a sputtering target for magnetite. To acquire magnetite having satisfactory crystalline structure, technique such as the heating of the substrate and an ion beam assist can be used. Magnetite and metal such as Fe are mixed by a method such as simultaneous sputtering, a thin film is formed and magnetite may be also deposited by heat treatment. As described above, even if magnetite does not have stoichiometrical composition or it is mixed with metal and others, the object of the invention is not impaired and similarly, a ferromagnetic ferrite thin film made of different composition may be also used.

FIGS. 16 to 20 respectively show a configurational example in which the giant magnetoresistive layered film and the single magnetic domain turning ferromagnetic layer are deposited in the magnetic head according to the invention.

Figure 16:
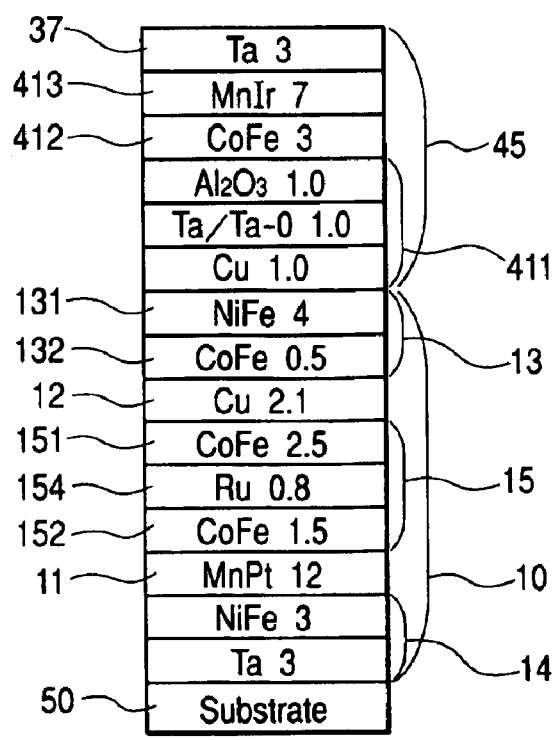
FIG. 16 shows a first example of a giant magnetoresistive layered film and a single magnetic domain turning ferromagnetic layer in the magnetic head according to the invention.

FIG. 16 shows a first configurational example including the giant magnetoresistive layered film and the single magnetic domain turning ferromagnetic layer in the magnetic head according to the invention. This configuration is equivalent to the concrete example of the structure shown in FIG. 1. Ta 3 nm thick and NiFe 3 nm thick as the underlayer 14, MnPt 12 nm thick as the antiferromagnetic film 11, CoFe 1.5 nm thick as the second ferromagnetic film 152, Ru 0.8 nm thick as the antiparallel coupling film 154, CoFe 2.5 nm thick as the first ferromagnetic film 151, Cu 2.1 nm thick as the non-magnetic conductive layer 12, CoFe 0.5 nm thick as the second free layer soft magnetic film 132, NiFe 4 nm thick as the first free layer soft magnetic film 131, Cu 1 nm thick and Ta/Ta—O 1.0 nm thick as the non-magnetic separating layer 411 also functioning as a protective film, CoFe 3 nm thick as the ferromagnetic layer 412, MnIr 7 nm thick as the antiferromagnetic layer 413 and Ta 3 nm thick as the protective film 37 are continuously formed on the substrate 50.

In this configurational example, in the giant magnetoresistive layered film 10, the ferromagnetic pinned layer 15 includes the antiparallel coupling film 154, the first ferromagnetic film 151 and the second ferromagnetic film 152. The Ru layer which is the antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. The soft magnetic free layer 13 is formed by a layered composed of NiFe which is the first free layer soft magnetic film and CoFe which is the second free layer soft magnetic film. Similarly, the single magnetic domain turning ferromagnetic layer 45 includes the non-magnetic separating layer 411 which is in contact with the soft magnetic free layer 13, the ferromagnetic layer 412, the antiferromagnetic layer 413 and the protective film 37. The non-magnetic separating layer 411 may also function as a protective film of the giant magnetoresistive layered film 10 and a definite boundary between the protective film and the non-magnetic separating layer 411 is not particularly required. The non-magnetic separating layer 411 has a function for preventing magnetic coupling from being produced between the soft magnetic free layer 13 and the single magnetic domain turning ferromagnetic layer 45, particularly the ferromagnetic layer 412 and is formed so that the thickness is 2 nm in total and thin to keep magnetostatic coupling between the soft magnetic free layer 13 and the single magnetic domain turning ferromagnetic layer 45, particularly the ferromagnetic layer 412 at the end in a direction of track width satisfactory.

Figure 17:
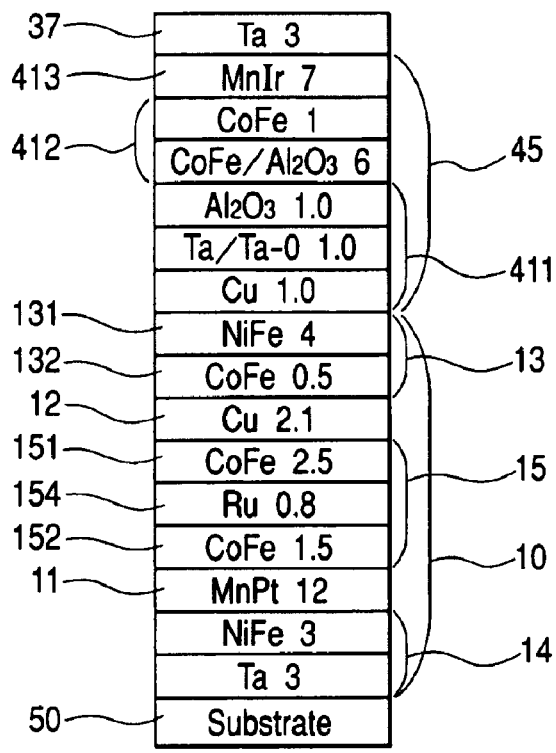
FIG. 17 shows a second example of a giant magnetoresistive layered film and a single magnetic domain turning ferromagnetic layer in the magnetic head according to the invention.

FIG. 17 shows a second configurational example including the giant magnetoresistive layered film and the single magnetic domain turning ferromagnetic layer in the magnetic head according to the invention. This configuration is equivalent to a concrete example of the structure shown in FIG. 1. Ta 3 nm thick and NiFe 3 nm thick as the underlayer 14, MnPt 12 nm thick as the antiferromagnetic film 11, CoFe 1.5 nm thick as the second ferromagnetic film 152, Ru 0.8 nm thick as the antiparallel coupling film 154, CoFe 2.5 nm thick as the first ferromagnetic film 151, Cu 2.1 nm thick as the non-magnetic conductive layer 12, CoFe 0.5 nm thick as the second free layer soft magnetic film 132, NiFe 4 nm thick as the first free layer soft magnetic film 131, Cu 1 nm thick and Ta/Ta—O 1.0 nm thick as the non-magnetic separating layer 411 also functioning as a protective film, a CoFe—$Al_2O_3$ mixed film 6 nm thick and CoFe 1 nm thick as the ferromagnetic layer 412, MnIr 7 nm thick as the antiferromagnetic layer 413 and Ta 3 nm thick as the protective film 37 are continuously formed on the substrate 50.

In this configurational example, in the giant magnetoresistive layered film 10, the ferromagnetic pinned layer 15 includes the antiparallel coupling film 154, the first ferromagnetic film 151 and the second ferromagnetic film 152. The Ru layer which is the antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. The soft magnetic free layer 13 is formed by a layered composed of NiFe which is the first free layer soft magnetic film and CoFe which is the second free layer soft magnetic film. Similarly, the single magnetic domain turning ferromagnetic layer 45 includes the non-magnetic separating layer 411 which is in contact with the soft magnetic free layer 13, the ferromagnetic layer 412, the antiferromagnetic layer 413 and the protective film 37. The non-magnetic separating layer 411 may also function as a protective film of the giant magnetoresistive layered film 10 and a definite boundary between the protective film and the non-magnetic separating layer 411 is not particularly required. The non-magnetic separating layer 411 has a function for preventing magnetic coupling from being produced between the soft magnetic free layer 13 and the single magnetic domain turning ferromagnetic layer 45, particularly the ferromagnetic layer 412 and is formed so that the thickness is 2 nm in total and thin to keep magnetostatic coupling between the soft magnetic free layer 13 and the single magnetic domain turning ferromagnetic layer 45, particularly the ferromagnetic layer 412 at the end in a direction of track width satisfactory. A part of the ferromagnetic layer 412 is formed by a CoFe—$Al_2O_3$ mixed film and has effect that enhances output by partially enhancing electric resistance.

Figure 18:
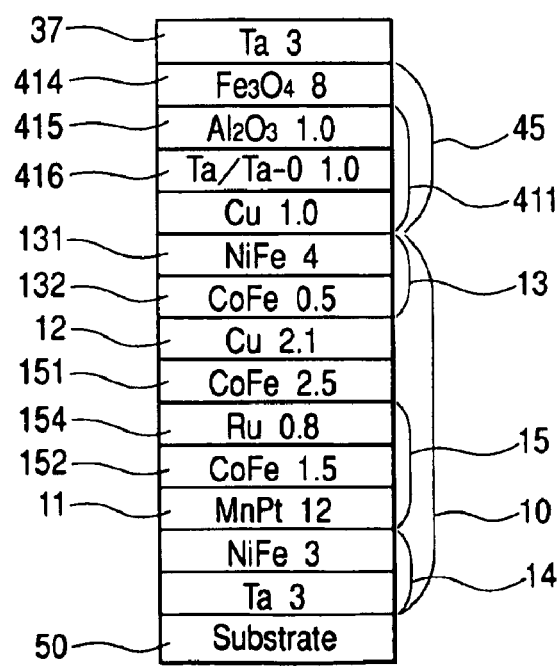
FIG. 18 shows a third example of a giant magnetoresistive layered film and a single magnetic domain turning ferromagnetic layer in the magnetic head according to the invention.

FIG. 18 shows a third configurational example including the giant magnetoresistive layered film and the single magnetic domain turning ferromagnetic layer in the magnetic head according to the invention. This configuration is equivalent to a concrete example of the structure shown in FIG. 2. Ta 3 nm thick and NiFe 3 nm thick as the underlayer 14, MnPt 12 nm thick as the antiferromagnetic film 11, CoFe 1.5 nm thick as the second ferromagnetic film 152, Ru 0.8 nm thick as the antiparallel coupling film 154, CoFe 2.5 nm thick as the first ferromagnetic film 151, Cu 2.1 nm thick as the non-magnetic conductive layer 12, CoFe 0.5 nm thick as the second free layer soft magnetic film 132, NiFe 4 nm thick as the first free layer soft magnetic film 131, Cu 1 nm thick, Ta/Ta—O 1.0 nm thick and $Al_2O_3$ 1 nm thick as the non-magnetic separating layer 411 also functioning as a protective film, $Fe_3O_4$ 8 nm thick as the hard magnetic layer 414 and Ta 3 nm thick as the protective film 37 are continuously formed on the substrate 50.

In this configurational example, in the giant magnetoresistive layered film 10, the ferromagnetic pinned layer 15 includes the antiparallel coupling film 154, the first ferromagnetic film 151 and the second ferromagnetic film 152. The Ru layer which is the antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. The soft magnetic free layer 13 is formed by a layered composed of NiFe which is the first free layer soft magnetic film and CoFe which is the second free layer soft magnetic film. Similarly, the single magnetic domain turning ferromagnetic layer 45 includes the non-magnetic separating layer 411 which is in contact with the soft magnetic free layer 13, the hard magnetic layer 414 and the protective film 37. The non-magnetic separating layer 411 may also function as a protective film of the giant magnetoresistive layered film 10 and a definite boundary between the protective film and the non-magnetic separating layer 411 is not particularly required. The non-magnetic separating layer 411 has a function for preventing magnetic coupling from being produced between the soft magnetic free layer 13 and the single magnetic domain turning ferromagnetic layer 45, particularly the ferromagnetic layer 412 and is formed so that the thickness is 3 nm in total and thin to keep magnetostatic coupling between the soft magnetic free layer 13 and the single magnetic domain turning ferromagnetic layer 45, particularly the ferromagnetic layer 412 at the end in a direction of track width satisfactory. It is described above that the hard magnetic layer 414 is made of $Fe_3O_4$, however, strictly speaking, the hard magnetic layer is not required to be made of stoichiometrical composition or even if metal and others are mixed, the object of this configurational example is not impaired.

Figure 19:
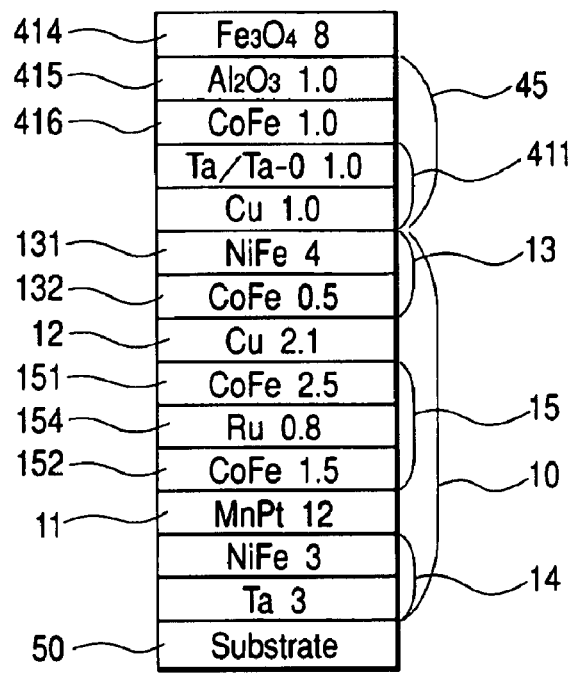
FIG. 19 shows a fourth example of a giant magnetoresistive layered film and a single magnetic domain turning ferromagnetic layer in the magnetic head according to the invention.

FIG. 19 shows a fourth configurational example including the giant magnetoresistive layered film and the single magnetic domain turning ferromagnetic layer in the magnetic head according to the invention. This configuration is equivalent to a concrete example of the structure shown in FIG. 3. Ta 3 nm thick and NiFe 3 nm thick as the underlayer 14, MnPt 12 nm thick as the antiferromagnetic film 11, CoFe 1.5 nm thick as the second ferromagnetic film 152, Ru 0.8 nm thick as the antiparallel coupling film 154, CoFe 2.5 nm thick as the first ferromagnetic film 151, Cu 2.1 nm thick as the non-magnetic conductive layer 12, CoFe 0.5 nm thick as the second free layer soft magnetic film 132, NiFe 4 nm thick as the first free layer soft magnetic film 131, Cu 1 nm thick, Ta/Ta—O 1.0 nm thick and $Al_2O_3$ 1 nm thick as the non-magnetic separating layer 411 also functioning as a protective film, CoFe 1 nm thick as the soft magnetic buffer layer 416, $Al_2O_3$ 1 nm thick as the coupling layer 415 and $Fe_3O_4$ 8 nm thick as the hard magnetic layer 414 are continuously formed on the substrate 50. In this example, though no protective film is used, there is no problem.

In this configurational example, in the giant magnetoresistive layered film 10, the ferromagnetic pinned layer 15 includes the antiparallel coupling film 154, the first ferromagnetic film 151 and the second ferromagnetic film 152. The Ru layer which is the antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. The soft magnetic free layer 13 is formed by a layered composed of NiFe which is the first free layer soft magnetic film and CoFe which is the second free layer soft magnetic film. Similarly, the single magnetic domain turning ferromagnetic layer 45 includes the non-magnetic separating layer 411 which is in contact with the soft magnetic free layer 13, the soft magnetic buffer layer 416, the coupling layer 415 and the hard magnetic layer 414. The non-magnetic separating layer 411 may also function as a protective film of the giant magnetoresistive layered film 10 and a definite boundary between the protective film and the non-magnetic separating layer 411 is not particularly required. The non-magnetic separating layer 411 has a function for preventing magnetic coupling from being produced between the soft magnetic free layer 13 and the single magnetic domain turning ferromagnetic layer 45, particularly the soft magnetic buffer layer 416 and is formed so that the thickness is 3 nm in total and thin to keep magnetostatic coupling between the soft magnetic free layer 13 and the single magnetic domain turning ferromagnetic layer 45, particularly the soft magnetic buffer layer 416 at the end in a direction of track width satisfactory. It is described above that the hard magnetic layer 414 is made of $Fe_3O_4$, however, strictly speaking, the hard magnetic layer is not required to be made of stoichiometrical composition or even if metal and others are mixed, the object of this configurational example is not impaired.

The coupling layer 415 controls magnetic coupling between the hard magnetic layer 414 and the soft magnetic buffer layer 416. In FIG. 19, an example that ferromagnetic coupling is produced between the hard magnetic layer 414 and the soft magnetic buffer layer 416 using $Al_2O_3$ is shown. When material for generating antiferromagnetic coupling such as Ru is selected for the coupling layer 415, the configurational example shown in FIG. 4 can be realized.

Figure 20:
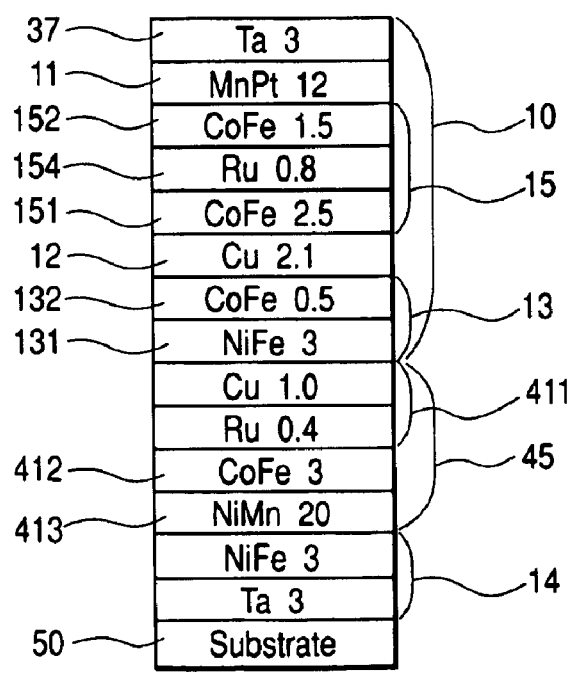
FIG. 20 shows a fifth example of a giant magnetoresistive layered film and a single magnetic domain turning ferromagnetic layer in the magnetic head according to the invention.

FIG. 20 shows a fifth configurational example including the giant magnetoresistive layered film and the single magnetic domain turning ferromagnetic layer in the magnetic head according to the invention. This configuration is equivalent to a concrete example with the substrate uppermost by turning the structure shown in FIG. 1 upside and down. Ta 3 nm thick and NiFe 3 nm thick as the underlayer 14, NiMn 20 nm thick as the antiferromagnetic layer 413, CoFe 3 nm thick as the ferromagnetic layer 412, Ru 0.4 nm thick and Cu 1 nm thick as the non-magnetic separating layer 411, NiFe 4 nm thick as the first free layer soft magnetic film 131, CoFe 0.5 nm thick as the second free layer soft magnetic film 132, Cu 2.1 nm thick as non-magnetic conductive layer 12, CoFe 2.5 nm thick as the first ferromagnetic film 151, Ru 0.8 nm thick as the antiparallel coupling film 154, CoFe 1.5 nm thick as the second ferromagnetic film 152, MnPt 12 nm thick as the antiferromagnetic film 11 and Ta 3 nm thick as the protective film 37 are continuously formed on the substrate 50.

In this configurational example, in the giant magnetoresistive layered film 10, the ferromagnetic pinned layer 15 includes the antiparallel coupling film 154, the first ferromagnetic film 151 and the second ferromagnetic film 152. The Ru layer which is the antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. The soft magnetic free layer 13 is formed by a deposition composed of NiFe which is the first free layer soft magnetic film and CoFe which is the second free layer soft magnetic film. Similarly, the single magnetic domain turning ferromagnetic layer 45 includes the non-magnetic separating layer 411 which is in contact with the soft magnetic free layer 13, the ferromagnetic layer 412, the antiferromagnetic layer 413 and the protective film 37. The non-magnetic separating layer 411 may also function as a protective film of the giant magnetoresistive layered film 10 and a definite boundary between the protective film and the non-magnetic separating layer 411 is not particularly required. The non-magnetic separating layer 411 has a function for preventing magnetic coupling from being produced between the soft magnetic free layer 13 and the single magnetic domain turning ferromagnetic layer 45, particularly the ferromagnetic layer 412 and is formed so that the thickness is 1.4 nm in total and thin to keep magnetostatic coupling between the soft magnetic free layer 13 and the single magnetic domain turning ferromagnetic layer 45, particularly the ferromagnetic layer 412 at the end in a direction of track width satisfactory.

Figure 21:
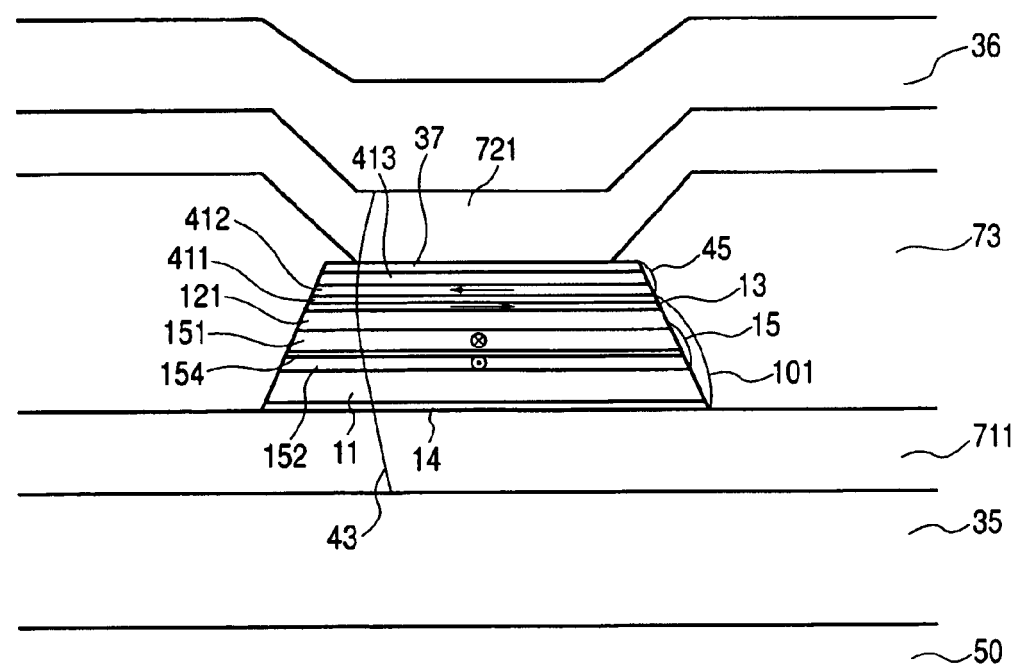
FIG. 21 shows an example of a tunnel magnetoresistive head according to the invention.

FIG. 21 shows a configurational example of a tunnel magnetoresistive head to which the invention is applied. FIG. 21 is a schematic sectional view viewed from an opposite surface opposite to a magnetic medium. A lower magnetic shield 35 and a lower conductive gap film 711 are formed on a substrate 50, a tunnel magnetoresistive layered film 101 is formed on them, further, an upper conductive gap film 721 and an upper magnetic shield 36 are formed and a read gap 43 for detecting a read signal is formed. An insulating film 73 is touched to both ends in a direction of track width of the tunnel magnetoresistive layered film 101 and insulates the other part so that sense current flows in a direction of the thickness of the tunnel magnetoresistive layered film 101. A method of forming the insulating film 73 and the form are described based upon structure produced according to a so-called lift-off process, however, various methods can be utilized. The tunnel magnetoresistive layered film 101 has the following structure shown in FIG. 21.

An underlayer 14, an antiferromagnetic film 11, a ferromagnetic pinned layer 15, a non-magnetic insulating gap layer 121 and a soft magnetic free layer 13 are continuously formed. In this configurational example, the ferromagnetic pinned layer 15 is formed by a layered composed of a first ferromagnetic film 151, a second ferromagnetic film 152 and an antiparallel coupling film 154. The antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. Even if the ferromagnetic pinned layer 15 is formed by one magnetic substance or is formed by a layered composed of two, four or more layers, the object of the invention is not impaired. The soft magnetic free layer 13 is formed by a layered composed of a first free layer soft magnetic film and a second free layer soft magnetic film, however, even if the soft magnetic free layer 13 is formed by one magnetic substance or is formed by a layered composed of two or more layers, the object of the invention is not impaired. In the invention, a single magnetic domain turning ferromagnetic layer 45 is deposited on the soft magnetic free layer 13 of the tunnel magnetoresistive layered film 101 and is formed in substantially the same size in a direction of track width as the tunnel magnetoresistive layered film 101. The single magnetic domain turning ferromagnetic layer 45 includes a non-magnetic separating layer 411 which is in contact with the soft magnetic free layer 13, a ferromagnetic layer 412, an antiferromagnetic layer 413 and a protective film 37. Even if the protective film 37 is not provided, the object of the invention is not impaired. Even if the hard magnetic film and the combination of the hard magnetic film and the soft magnetic film respectively shown in FIGS. 2 and 3 are used in place of the antiferromagnetic layer 413 and the ferromagnetic layer 412, the similar effect is acquired.

The non-magnetic separating layer 411 disconnects magnetic junction between the soft magnetic free layer 13 and the ferromagnetic layer 412 and prevents both from following a magnetization process for ferromagnetically coupling them. For the non-magnetic separating layer 411, for example, a layer 1 nm thick made of Ta or a film on which further Ru, Cu and others are deposited can be used. However, when a single layer made of Ru and others and having predetermined thickness such as 0.8 nm is arranged between ferromagnetic substances, strong antiferromagnetic coupling that acts between the ferromagnetic substances is produced between the ferromagnetic substances and it is not desirable. When magnetoresistance is produced from the adjacent ferromagnetic substance via the non-magnetic separating layer 411, a signal waveform may be deformed and it is not desirable. Therefore, the effect of the invention cannot be expected in configuration that the non-magnetic separating layer 411 is formed by one layer 2 nm thick made of Cu and is located between ferromagnetic substances. The non-magnetic separating layer 411 or a part may also function as a protective film of the tunnel magnetoresistive effect lamination film 101. The antiferromagnetic layer 413 is polarized in a direction of track width perpendicular to an external magnetic field and has a function that applies exchange coupling to the ferromagnetic layer 412 and sets the magnetization of the ferromagnetic layer 412 to the direction of track width in a state in which an external magnetic field is zero. The magnetization of the ferromagnetic layer 412 and the magnetization of the soft magnetic free layer 13 mutually becomes antiparallel, are magnetostatically coupled at the end in the direction of track width, a closed magnetic circuit is formed and the soft magnetic free layer 13 is turned a single magnetic domain respectively by laminated the single magnetic domain turning ferromagnetic layer 45 on the soft magnetic free layer 13 of the tunnel magnetoresistive effect deposition film 101 and forming the single magnetic domain turning ferromagnetic layer 45 in substantially the same size in the direction of track width as the tunnel magnetoresistive layered film 101. In case distance between end of the soft magnetic free layer 13 and the end of the ferromagnetic layer 412 is near enough, a magnetization amount in the soft magnetic free layer 13 and a magnetization amount in the ferromagnetic layer 412 may be substantially equal. As a magnetization amount in the ferromagnetic layer 412 decreases as far as the soft magnetic free layer when both are apart, a magnetization amount in the ferromagnetic layer is set so that it is more than a magnetization amount in the soft magnetic free layer.

As shown by arrows in FIG. 21, a direction of the magnetization of the soft magnetic free layer 13 becomes antiparallel to the magnetization of the single magnetic domain turning ferromagnetic layer 45, and magnetic anisotropy, the magnitude of detection current, a magnetization amount in the ferromagnetic pinned layer 15 and stripe height which is the size in depth of the element are set so that an external magnetic field is the direction of track width in a state in which it is zero to keep bias characteristics symmetrical.

In FIG. 21, the example of the tunnel magnetoresistive head using the non-magnetic insulating gap layer 121 is shown, however, a CPP type giant magnetoresistive head in which current is made to flow in a direction of the thickness of a giant magnetoresistive layered film using a conductive intermediate layer in place of the non-magnetic insulating gap layer 121 also has substantially the same configuration as the configuration shown in FIG. 21 and satisfactory effect is acquired.

Figure 22:
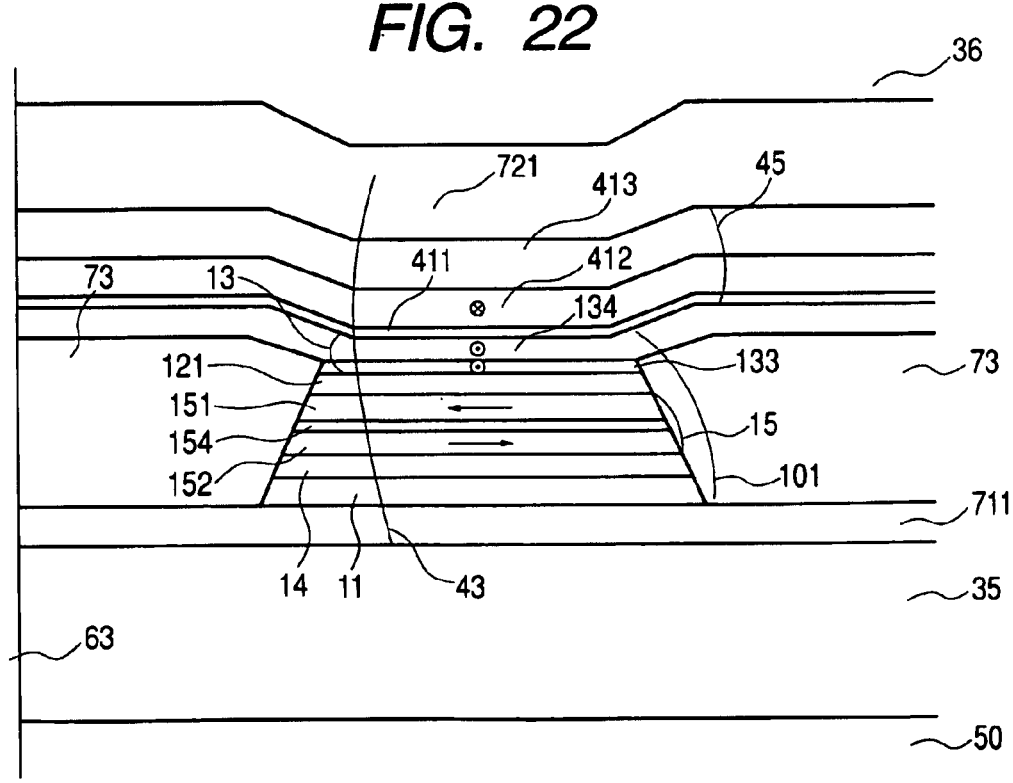
FIG. 22 shows another example of the tunnel magnetoresistive head according to the invention.

FIG. 22 shows another configurational example of the tunnel magnetoresistive head to which the invention is applied. FIG. 22 is a schematic sectional view in which the section perpendicular to the opposite surface opposite to a magnetic medium and the surface of a substrate is viewed from a direction of track width. A lower magnetic shield 35 and a lower conductive gap film 711 are formed on a substrate 50, a tunnel magnetoresistive layered film 101 is formed on them, further, an upper conductive gap film 721 and an upper magnetic shield 36 are formed and a read gap 43 for detecting a read signal is formed. An insulating film 73 is touched to both ends in the direction of track width and in a direction of stripe height of the tunnel magnetoresistive layered film 101 and insulates the other part so that sense current flows in a direction of the thickness of the tunnel magnetoresistive layered film 101. A method of forming the insulating film 73 and the form are described based upon structure produced according to a so-called lift-off process, however, various methods can be utilized. The tunnel magnetoresistive layered film 101 has the following structure shown in FIG. 22.

An underlayer 14, an antiferromagnetic film 11, a ferromagnetic pinned layer 15, a non-magnetic insulating gap layer 121 and a soft magnetic free layer 13 are continuously formed. In this configurational example, the ferromagnetic pinned layer 15 is formed by a deposition composed of a first ferromagnetic film 151, a second ferromagnetic film 152 and an antiparallel coupling film 154. The antiparallel coupling film 154 has effect that applies exchange coupling for arraying the magnetization of the first ferromagnetic film 151 and the magnetization of the second ferromagnetic film 152 mutually in antiparallel and controls so that a substantial magnetization amount in the ferromagnetic pinned layer becomes difference between a magnetization amount in the first ferromagnetic film 151 and a magnetization amount in the second ferromagnetic film 152. Even if the ferromagnetic pinned layer 15 is formed by one magnetic substance or is formed by a layered composed of two, four or more layers, the object of the invention is not impaired. The soft magnetic free layer 13 is formed by a layered composed of a first soft magnetic free layer 133 and a second soft magnetic free layer 134. Even if the soft magnetic free layer 13 is formed by one magnetic body or is formed by a layered composed of two or more layers, the object of the invention is not impaired. A part of the soft magnetic free layer 13, particularly the second soft magnetic free layer 134 in FIG. 22 is formed so that it is larger in the direction of stripe height than the other part of the tunnel magnetoresistive layered film 101, is extended up the opposite surface 63 and has a function as a flux guide for inducing a magnetic flux from the opposite surface 63. It is desirable that a magnetization amount in the second soft magnetic free layer 134 is set so that it is more than a magnetization amount in the first soft magnetic free layer 133 in the example shown in FIG. 22 and the magnetization of the second soft magnetic free layer 134 is substantially dominant. In the invention, a single magnetic domain turning ferromagnetic layer 45 is laminated on the soft magnetic free layer 13 of the tunnel magnetoresistive layered film 101, particularly the second soft magnetic free layer substantially dominant and is formed in substantially the same size in the direction of track width as the tunnel magnetoresistive layered film 101. The single magnetic domain turning ferromagnetic layer 45 includes a deposition composed of a non-magnetic separating layer 411 which is in contact with the soft magnetic free layer 13, a ferromagnetic layer 412 and an antiferromagnetic layer 413. Even if a hard magnetic film and a combination of a hard magnetic film and a soft magnetic film are used as shown in FIGS. 2 and 3 in place of the antiferromagnetic layer 413 and the ferromagnetic layer 412, the similar effect is acquired.

The non-magnetic separating layer 411 disconnects magnetic junction between the soft magnetic free layer 13 and the ferromagnetic layer 412 and prevents both from following a magnetization process for ferromagnetically coupling both. For the non-magnetic separating layer 411, a layer 1 nm thick made of Ta and a film in which Ru, Cu and others are further deposited can be used. The non-magnetic separating layer 411 or a part may also function as a protective film of the tunnel magnetoresistive effect deposition film 101. The antiferromagnetic layer 413 is polarized in the direction of track width perpendicular to an external magnetic field and has a function that applies exchange coupling to the ferromagnetic layer 412 and sets the magnetization of the ferromagnetic layer 412 to the direction of track width in a state in which an external magnetic filed is zero. The magnetization of the ferromagnetic layer 412 and the magnetization of the soft magnetic free layer 13 mutually become antiparallel, are magnetostatically coupled at the end in the direction of track width, a closed magnetic circuit is formed and the soft magnetic free layer 13 also functioning as a flux guide is turned a single magnetic domain respectively by depositing the single magnetic domain turning ferromagnetic layer 45 on the soft magnetic free layer 13 of the tunnel magnetoresistive layered film 101 and forming the single magnetic domain turning ferromagnetic layer in substantially the same size in the direction of track width as the tunnel magnetoresistive layered film 101. In case the end of the soft magnetic free layer 13 and the end of the ferromagnetic layer 412 are near enough, a magnetization amount in the soft magnetic free layer 13 and a magnetization amount in the ferromagnetic layer 412 may be substantially equal. As a magnetic effect of the ferromagnetic layer 412 decreases as far as the soft magnetic free layer when both are apart, it is set so that it is more than a magnetization amount in the soft magnetic free layer.

As shown by arrows in FIG. 22, a direction of the magnetization of the soft magnetic free layer 13 becomes antiparallel to the magnetization of the single magnetic domain turning ferromagnetic layer 45, and magnetic anisotropy, the magnitude of detection current, a magnetization amount in the ferromagnetic pinned layer 15 and stripe height which is the size in depth of the element are set so that the direction of the magnetization of the soft magnetic free layer is substantially equivalent to the direction of track width in a state in which an external magnetic field is zero to keep bias characteristics symmetrical.

In FIG. 22, the example of the tunnel magnetoresistive head using the non-magnetic insulating gap layer 121 is shown, however, a CPP type giant magnetoresistive head in which current is made to flow in a direction of the thickness of the giant magnetoresistive layered film using a conductive intermediate layer in place of the non-magnetic insulating gap layer 121 also has substantially the similar configuration to that of the tunnel magnetoresistive head shown in FIG. 22 and satisfactory effect is acquired.

Figure 23:
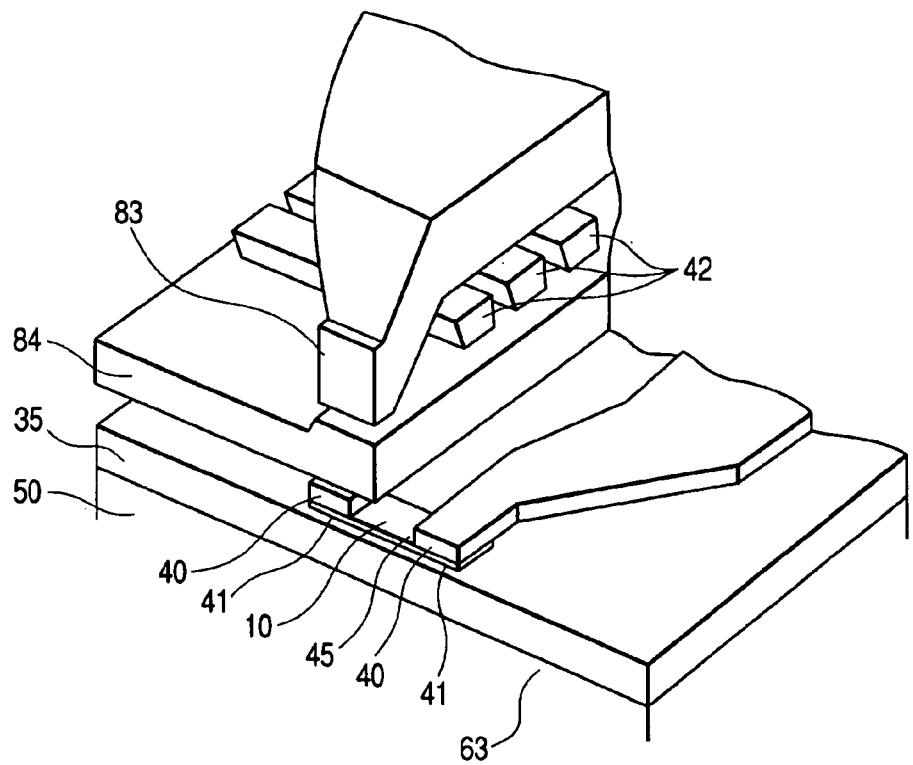
FIG. 23 shows a configurational example of a magnetic head on which a magnetic sensor formed by the magnetoresistive element according to the invention is mounted.

FIG. 23 shows a configurational example of a magnetic head on which a magnetic sensor formed by the magnetoresistive element according to the invention is mounted. The magnetoresistive layered film 10, the single magnetic domain turning ferromagnetic layer 45, the electrode 40, the lower magnetic shield 35, the upper magnetic shield 36, a lower magnetic core 84, a coil 42, an upper core 83 are formed on the substrate 50 and forms the opposite surface 63. FIG. 23 shows structure in which the upper shield and the lower core are individually formed, however, even if the upper shield also functions as the lower core, the object of the invention is not impaired. The lower magnetic core 84, the coil 42 and the upper magnetic core 83 form a recording head, generate a magnetic field generated by electromagnetic induction effect from a record gap of the opposite surface 63 and record on a recording medium of a magnetic recording disk.

Figure 24:
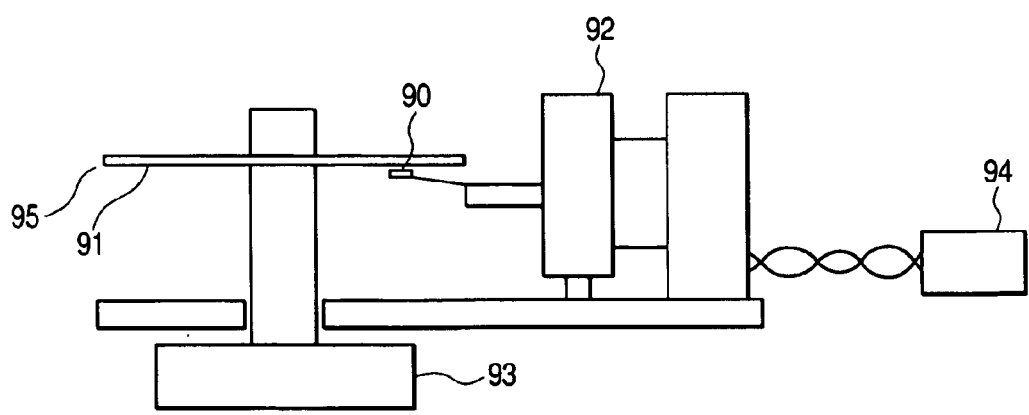
FIG. 24 shows a configurational example of a magnetic disk unit according to the invention.

FIG. 24 shows a configurational example of a magnetic disk unit according to the invention. A disk 95 holding a recording medium 91 for magnetically recording information is turned by a spindle motor 93 and a head slider 90 is induced over a track of the disk 95 by an actuator 92. That is, in a magnetic recording disk drive, a reading head and a recording head on the head slider 90 approach a predetermined recording position over the disk 95, reciprocate owing to this mechanism and sequentially read/write a signal. It is desirable that the actuator 92 is a rotary actuator. A write signal via a signal processing system 94 is recorded on the medium by the recording head and the output of the reading head is acquired as a signal via the signal processing system 94. Further, when the reading head is moved over a desired record track, a position on the track is detected using sensitive output from the reading head, the actuator is controlled and the head slider can be positioned. In FIG. 24, one head slider 90 and one disk 95 are shown, however, plural ones may be also provided. The disk 95 may be also provided with the recording medium 91 on both surfaces. In case information is recorded on both surface of the disk, the head slider 90 are arranged over both surfaces of the disk.

As a result of testing the magnetic head having the above-mentioned configuration according to the invention and the magnetic disk unit in which the magnetic head was mounted, sufficient output and satisfactory bias characteristics were acquired and the reliability of the operation was also satisfactory.

Figure 25:
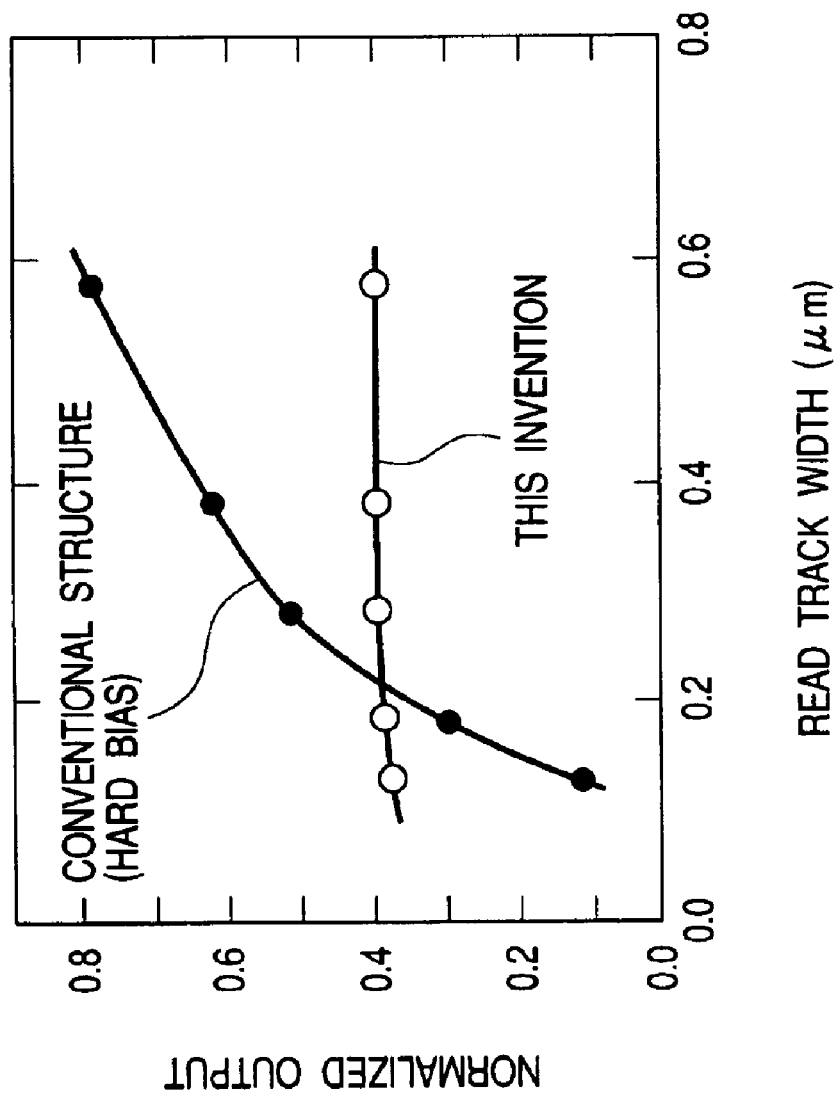
FIG. 25 shows respective relation between read track width and read output of magnetic heads having the structure in the prior art and the structure according to the invention.

FIG. 25 shows relation between the read track width and the read output of the magnetic heads respectively having the structure according to prior art and the structure according to the invention. FIG. 25 shows the result of the magnetic head using the conventional type giant magnetoresistive element in a plane of which current flows. In the magnetic head having the hard-bias structure according to prior art, when read track width is wide, high output is acquired, however, when read track width is narrowed, read output is deteriorated, particularly when read track width is 0.2 μm or less, read output becomes a half or less. In the meantime, in the magnetic head according to the invention, as there is no loss by shunt current, read output is low when read track width is wide, however, even if read track width is narrowed, read output is hardly deteriorated and as a result, high read output is acquired, compared with that of the magnetic head according to prior art. Particularly, in the magnetic head the read track width of which is 0.2 μm or less, output higher by 10% to a few times or more than that in the conventional type head can be acquired. As described above, the invention shows high performance as the magnetic head and particularly, can realize the magnetic disk unit the recording density of which is high.

As described above in detail, according to the invention, the magnetic sensor having stable characteristics and high output and the magnetic head using it are acquired, particularly, the magnetic head having satisfactory read output in high recording density and the high-density magnetic disk unit can be acquired.

What is claimed is:

1. A magnetic head provided with a spin-valve type magnetoresistive element in which a ferromagnetic layer a direction of the magnetization of which is substantially pinned for an external magnetic field and a soft magnetic free layer the magnetization of which can be turned according to an external magnetic field, are laminated, via a non-magnetic intermediate layer, and characterized in that the magnetization of the soft magnetic free layer is rotated according to the external magnetic field, a relative angle between a direction of the magnetization of the soft magnetic layer and a direction of the magnetization of the ferromagnetic layer varies and magnetoresistance is produced, wherein:

a single magnetic domain turning ferromagnetic layer is formed on the soft magnetic free layer, via a non-magnetic separating layer;

the single magnetic domain turning ferromagnetic layer turns the soft magnetic free layer a single magnetic domain so that the soft magnetic free layer has magnetization substantially induced in a direction substantially perpendicular to an external magnetic field because the soft magnetic free layer and the single magnetic domain turning ferromagnetic layer are magnetostatically coupled, via the non-magnetic separating layer, at the end of track width, and a closed magnetic circuit is formed;

the single magnetic domain turning ferromagnetic layer has effectively fixed magnetization in the direction of substantially perpendicular to an external magnetic field from a magnetic medium; and the single magnetic domain turning ferromagnetic layer is provided with a hard magnetic film made of a mixture of a semiconductor and ferromagnetic metal.

2. A magnetic head, comprising:

a spin-valve type magnetoresistive element in which a ferromagnetic pinned layer, a non-magnetic intermediate layer, a soft magnetic free layer, a non-magnetic separating layer and a single magnetic domain turning ferromagnetic layer are laminated in the order and are formed in substantially the same track width corresponding to a predetermined magnetic field sensing width, wherein:

no ferromagnetic or antiferromagnetic coupling is substantially produced between the soft magnetic free layer and the single magnetic domain turning ferromagnetic layer, via the non-magnetic separating layer, the magnetization of the single magnetic domain turning ferromagnetic layer and the magnetization of the soft magnetic free layer are magnetostatically coupled at the end of track width, and a closed magnetic circuit is formed;

the soft magnetic free layer is turned a single magnetic domain so that the soft magnetic free layer has magnetization substantially induced in a direction substantially perpendicular to an external magnetic field;

a direction of the magnetization of the ferromagnetic induced layer is substantially pinned for an external magnetic field, the magnetization of the soft magnetic free layer is turned according to an external magnetic field, a relative angle between the magnetization of the soft magnetic free layer and the magnetization of the ferromagnetic pinned layer varies, magnetoresistive change is generated in the magnetoresistive element and is detected by a pair of electrodes;

the single magnetic domain turning ferromagnetic layer has effectively fixed magnetization in the direction of substantially perpendicular to an external magnetic field from a magnetic medium; and the single magnetic domain turning ferromagnetic layer is provided with a hard magnetic film made of a mixture of a semiconductor and ferromagnetic metal.

3. A magnetic head according to claim 1, wherein:

a bias magnetic field is applied to the ferromagnetic pinned layer by laminating the ferromagnetic pinned layer and an antiferromagnetic film or a hard magnetic film and producing exchange coupling and the ferromagnetic pinned layer is polarized in a direction substantially perpendicular to an external magnetic field.

4. A magnetic head according to claim 1, wherein:

the single magnetic domain turning ferromagnetic layer is formed by a hard magnetic film; and the hard magnetic film is magnetizing in a direction substantially perpendicular to an external magnetic field.

5. A magnetic head according to claim 1, wherein:

the single magnetic domain turning ferromagnetic layer is formed by a layered film having ferromagnetic or antiferromagnetic coupling between a hard magnetic film and a soft magnetic buffer layer, via a coupling film; and the magnetization of the hard magnetic film and the magnetization of the soft magnetic buffer layer are polarized in a direction substantially perpendicular to an external magnetic field.

6. A magnetic head according to claim 1, wherein:

the non-magnetic separating layer is made of Ta, Hf, Nb, Ti or W or the oxide of any of these.

7. A magnetic head according to claim 1, wherein:

the non-magnetic separating layer is formed by a deposition of a layer including at least one of Cu, Au, Ag, Pt, Re, Ru, Ir, Os Ta, Hf, Nb, Ti and W or a layer including these and a layer made of oxide or a mixture of at least one of Cu, Au, Ag, Pt, Re, Ru, Ir, Os, Ta, Hf, Nb, Ti and W and oxide.

8. A magnetic head according to claim 2, wherein:

the single magnetic domain turning ferromagnetic layer is formed by a hard magnetic film; and the hard magnetic film is magnetizing in a direction substantially perpendicular to an external magnetic field.

9. A magnetic head according to claim 2, wherein:

the single magnetic domain turning ferromagnetic layer is formed by a layered film having ferromagnetic or antiferromagnetic coupling between a hard magnetic film and a soft magnetic buffer layer, via a coupling film; and the magnetization of the hard magnetic film and the magnetization of the soft magnetic buffer layer are polarized in a direction substantially perpendicular to an external magnetic field.

10. A magnetic head comprising:

a magnetoresistive element having a soft magnetic free layer, a ferromagnetic pinned layer and a non-magnetic layer formed between the soft magnetic free layer and the ferromagnetic pinned layer, a single magnetic domain turning ferromagnetic layer having effectively fixed magnetization in the direction of substantially perpendicular to an external magnetic field from a magnetic medium, formed above the soft magnetic free layer, wherein a magnetization of the single magnetic domain turning ferromagnetic layer and a magnetization of the magnetic free layer are magnetostatically coupled at the end of track width, and wherein the single magnetic domain turning ferromagnetic layer is provided with a hard magnetic film made of a mixture of a semiconductor and ferromagnetic metal.

11. A magnetic head according to claim 10, wherein the total magnetization of the single magnetic domain turning ferromagnetic layer and the magnetic free layer forms a closed magnetic circuit.

12. A magnetic head according to claim 10, wherein a non-magnetic separating layer is formed between the single, magnetic domain turning ferromagnetic layer and the soft magnetic free layer.

13. A magnetic head according to claim 10, wherein the single magnetic domain turning ferromagnetic layer turns the soft magnetic free layer a single magnetic domain so that the soft magnetic free layer has magnetization substantially induced in a direction substantially perpendicular to an external magnetic field.

14. A magnetic head according to claim 10, wherein:

a bias magnetic field is applied to the ferromagnetic pinned layer by laminating the ferromagnetic pinned layer and an antiferromagnetic film or a hard magnetic film and producing exchange coupling and the ferromagnetic pinned layer is polarized in a direction substantially perpendicular to an external magnetic field.

15. A magnetic head according to claim 10, wherein:

the single magnetic domain turning ferromagnetic layer is formed by a hard magnetic film; and the hard magnetic film is magnetizing in a direction substantially perpendicular to an external magnetic field.

16. A magnetic head according to claim 11, wherein:

the single magnetic domain turning ferromagnetic layer is formed by a layered film having ferromagnetic or antiferromagnetic coupling between a hard magnetic film and a soft magnetic buffer layer, via a coupling film; and the magnetization of the hard magnetic film and the magnetization of the soft magnetic buffer layer are polarized in a direction substantially perpendicular to an external magnetic field.

17. A magnetic head according to claim 10, wherein:

the non-magnetic separating layer is made of Ta, Hf, Nb, Ti or W or the oxide of any of these.

18. A magnetic head according to claim 10, wherein:

the non-magnetic separating layer is formed by a deposition of a layer including at least one of Cu, Au, Ag, Pt, Re, Ru, Ir, Os, Ta, Hf, Nb, Ti and W or a layer including these and a layer made of oxide or a mixture of at least one of Cu, Au, Ag, Pt, Re, Ru, Ir, Os, Ta, Hf, Nb, Ti and W and oxide.

* * * * *